(12) United States Patent
Hsu et al.

(10) Patent No.: US 10,025,072 B2
(45) Date of Patent: Jul. 17, 2018

(54) IMAGING LENS ASSEMBLY, IMAGE CAPTURING UNIT AND ELECTRONIC DEVICE

(71) Applicant: LARGAN Precision Co., Ltd., Taichung (TW)

(72) Inventors: Po-Lun Hsu, Taichung (TW); Wei-Yu Chen, Taichung (TW)

(73) Assignee: LARGAN Precision Co., Ltd., Taichung (TW)

( * ) Notice: Subject to any disclaimer, the term of this patent is extended or adjusted under 35 U.S.C. 154(b) by 9 days.

(21) Appl. No.: 15/410,495

(22) Filed: Jan. 19, 2017

(65) Prior Publication Data

US 2018/0074293 A1 Mar. 15, 2018

(30) Foreign Application Priority Data

Sep. 14, 2016 (TW) .............................. 105130052 A

(51) Int. Cl.
*G02B 13/18* (2006.01)
*G02B 9/62* (2006.01)
*G02B 13/00* (2006.01)
*G02B 5/20* (2006.01)

(52) U.S. Cl.
CPC ......... *G02B 13/0045* (2013.01); *G02B 5/208* (2013.01); *G02B 9/62* (2013.01)

(58) Field of Classification Search
CPC ....... G02B 9/62; G02B 13/04; G02B 13/0045
USPC ......................... 359/713, 752, 756, 757, 759
See application file for complete search history.

(56) References Cited

U.S. PATENT DOCUMENTS

| 2015/0062405 A1 | 3/2015 | Chen et al. |
| 2016/0119519 A1 | 4/2016 | Chen et al. |

FOREIGN PATENT DOCUMENTS

CN 105204138 12/2015

*Primary Examiner* — William Choi
(74) *Attorney, Agent, or Firm* — Hanley, Flight & Zimmerman, LLC

(57) ABSTRACT

An imaging lens assembly includes, in order from an object side to an image side, a first lens element, a second lens element, a third lens element, a fourth lens element, a fifth lens element and a sixth lens element. The first lens element and the fourth lens element have positive refractive power. The second lens element with positive refractive power has an image-side surface being convex in a paraxial region thereof. The fifth lens element has an object-side surface and an image-side surface being both aspheric. The sixth lens element has an image-side surface being concave in a paraxial region thereof, wherein the image-side surface thereof has at least one convex shape in an off-axial region thereof, and an object-side surface and the image-side surface thereof are both aspheric. The imaging lens assembly has a total of six single and non-cemented lens elements.

26 Claims, 23 Drawing Sheets

IMAGING LENS ASSEMBLY, IMAGE CAPTURING UNIT AND ELECTRONIC DEVICE

RELATED APPLICATIONS

This application claims priority to Taiwan Application 105130052, filed Sep. 14, 2016, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

In recent years, with the popularity of electronic devices having camera functionalities, the demand of miniaturized optical systems has been increasing. As the advanced semiconductor manufacturing technologies have reduced the pixel size of sensors, and compact optical systems have gradually evolved toward the field of higher megapixels, there is an increasing demand for compact optical systems featuring better image quality.

The optical systems have been widely applied to different kinds of smart electronic devices, such as vehicle devices, image recognition systems, entertainment devices, sport devices and intelligent home assistance systems, for various requirements. In order to provide better user experience, the electronic device equipped with one or more optical systems having different fields of view has become the mainstream product in the market. For various applications, the optical systems are developed with various optical characteristics, such that there is an increasing demand for optical system featuring wide field of view, and the specifications of the optical system also includes strict requirements.

However, a lens element having stronger refractive power is usually disposed close to an object side of the conventional optical system, such that projecting light from a large field of view into the optical system becomes difficult. Moreover, a fourth lens element in the conventional optical system usually has weaker refractive power, such that light rays traveling from the large field of view cannot converge on an image surface. Thus, there is a need to develop an optical system featuring large view angle, compact size and high image quality.

SUMMARY

According to one aspect of the present disclosure, an imaging lens assembly includes, in order from an object side to an image side, a first lens element, a second lens element, a third lens element, a fourth lens element, a fifth lens element and a sixth lens element. The first lens element has positive refractive power. The second lens element with positive refractive power has an image-side surface being convex in a paraxial region thereof. The fourth lens element has positive refractive power. The fifth lens element has an object-side surface and an image-side surface being both aspheric. The sixth lens element has an image-side surface being concave in a paraxial region thereof, wherein the image-side surface of the sixth lens element has at least one convex shape in an off-axial region thereof, and an object-side surface and the image-side surface of the sixth lens element are both aspheric. The imaging lens assembly has a total of six lens elements, and each of the lens elements of the imaging lens assembly is a single and non-cemented lens element. When a focal length of the first lens element is f1, a focal length of the second lens element is f2, a focal length of the fourth lens element is f4, a curvature radius of an object-side surface of the third lens element is R5, a curvature radius of an image-side surface of the third lens element is R6, the following conditions are satisfied:

$|f4/f1|+|f4/f2|<0.92;$ $-8.0<(R5+R6)/(R5-R6)<0.50;$ and $|f1/f2|<2.0.$

According to another aspect of the present disclosure, an image capturing unit includes the aforementioned imaging lens assembly and an image sensor, wherein the image sensor is disposed on an image surface of the imaging lens assembly.

According to another aspect of the present disclosure, an electronic device includes the aforementioned image capturing unit.

According to still another aspect of the present disclosure, an imaging lens assembly includes, in order from an object side to an image side, a first lens element, a second lens element, a third lens element, a fourth lens element, a fifth lens element and a sixth lens element. The first lens element has positive refractive power. The second lens element with positive refractive power has an image-side surface being convex in a paraxial region thereof. The fourth lens element has positive refractive power. The fifth lens element has an image-side surface being convex in a paraxial region thereof, wherein an object-side surface and the image-side surface of the fifth lens element are both aspheric. The sixth lens element has an image-side surface being concave in a paraxial region thereof, wherein the image-side surface of the sixth lens element has at least one convex shape in an off-axial region thereof, and an object-side surface and the image-side surface of the sixth lens element are both aspheric. The imaging lens assembly has a total of six lens elements, and each of the lens elements of the imaging lens assembly is a single and non-cemented lens element. When a focal length of the first lens element is f1, a focal length of the second lens element is f2, a focal length of the fourth lens element is f4, a curvature radius of an object-side surface of the second lens element is R3, a curvature radius of the image-side surface of the second lens element is R4, a curvature radius of an object-side surface of the third lens element is R5, a curvature radius of an image-side surface of the third lens element is R6, the following conditions are satisfied:

$|f4/f1|+|f4/f2|<1.0;$ $-8.0<(R5+R6)/(R5-R6)<0.50;$ and $-0.50<(R3+R4)/(R3-R4)<8.0.$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
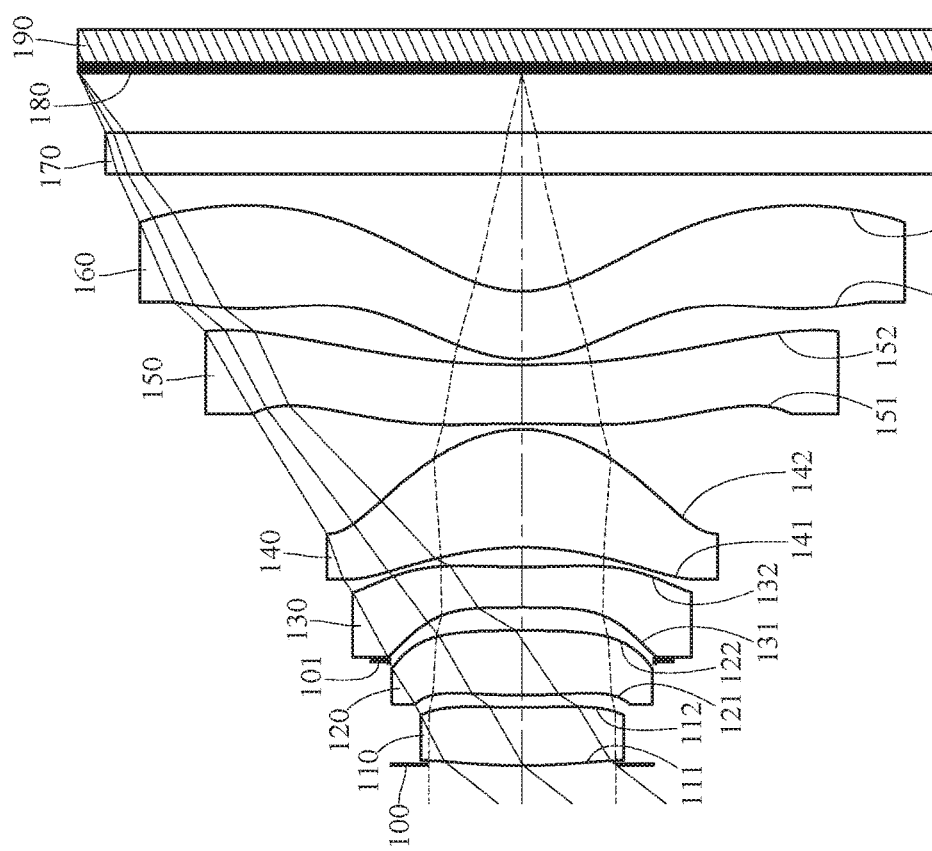
FIG. 1 is a schematic view of an image capturing unit according to the 1st embodiment of the present disclosure.

An imaging lens assembly includes, in order from an object side to an image side, a first lens element, a second lens element, a third lens element, a fourth lens element, a fifth lens element and a sixth lens element. The imaging lens assembly has a total of six lens elements.

There can be an air gap in a paraxial region between each of the adjacent lens elements of the imaging lens assembly; that is, each of the first through the sixth lens elements can be a single and non-cemented lens element. Due to the manufacturing process of the cemented lenses is more complex than the non-cemented lenses, particularly when an image-side surface of one lens element and an object-side surface of the following lens element need to have accurate curvature to ensure their highly cemented characteristic. However, during the cementing process, those two lens elements might not be highly cemented due to displacements and it is thereby not favorable for image quality. Therefore, there can be an air gap in a paraxial region between each of the adjacent lens elements of the imaging lens assembly for solving the problem generated by the cemented lens elements.

The first lens element has positive refractive power. Therefore, it is favorable for reducing a total track length of the imaging lens assembly so as to maintain a compact size thereof.

The second lens element with positive refractive power has an image-side surface being convex in a paraxial region thereof. Therefore, it is favorable for properly arranging the positive refractive power of the first and the second lens elements so as to reduce the sensitivity of the imaging lens assembly.

The fourth lens element with positive refractive power can have an object-side surface being concave in a paraxial region thereof and an image-side surface being convex in a paraxial region thereof. Therefore, it is favorable for projecting light from a large field of view in the imaging lens assembly. Furthermore, with the arrangement of the first and the second lens elements, it is favorable for reducing the total track length so as to keep the imaging lens assembly compact.

The fifth lens element can have an image-side surface being convex in a paraxial region thereof. Therefore, it is favorable for correcting aberrations generated by the fourth lens element having overly strong refractive power.

The sixth lens element has an image-side surface being concave in a paraxial region thereof, wherein the image-side surface of the sixth lens element has at least one convex shape in an off-axial region thereof. Therefore, it is favorable for correcting the Petzval sum so as to improve the flatness of an image surface and correct aberrations at the off-axial region.

When a focal length of the first lens element is f1, a focal length of the second lens element is f2, a focal length of the fourth lens element is f4, the following condition is satisfied: $|f4/f1|+|f4/f2|<1.0$. Therefore, it is favorable for preventing the overly narrow field of view due to excessively strong refractive power of the first and the second lens elements, thereby obtaining a good balance between compactness and wide field of view. Preferably, the following condition can also be satisfied: $|f4/f1|+|f4/f2|<0.92$.

When a curvature radius of an object-side surface of the third lens element is R5, a curvature radius of an image-side surface of the third lens element is R6, the following condition is satisfied: $-8.0<(R5+R6)/(R5-R6)<0.50$. Therefore, it is favorable for arranging the third lens element to correct aberrations generated by the first and the second lens elements, thereby improving image quality. Preferably, the following condition can also be satisfied: $-3.0<(R5+R6)/(R5-R6)<0.25$.

When the focal length of the first lens element is f1, the focal length of the second lens element is f2, the following condition is satisfied: $|f1/f2|<2.0$. Therefore, it is favorable for preventing the refractive power of the first lens element from overly strong so as to enhance the large view angle of the imaging lens assembly.

When a curvature radius of an object-side surface of the second lens element is R3, a curvature radius of the image-side surface of the second lens element is R4, the following condition is satisfied: $-0.50<(R3+R4)/(R3-R4)<8.0$. Therefore, it is favorable for preventing the shape of the second lens element from overly curved or complex so as to reduce surface reflection and manufacturing problems. Preferably, the following condition can also be satisfied: $-0.25<(R3+R4)/(R3-R4)<2.0$.

When a sum of axial distances between each adjacent lens element of the imaging lens assembly is ΣAT, an entrance pupil diameter of the imaging lens assembly is EPD, the following condition can be satisfied: $0<\Sigma AT/EPD<0.75$. Therefore, it is favorable for providing a large aperture and arranging the lens elements in the imaging lens assembly with proper spacing.

When an axial distance between the first lens element and the second lens element is T12, a central thickness of the second lens element is CT2, the following condition can be satisfied: $0<T12/CT2<0.80$. Therefore, it is favorable for properly arranging the distance between the first and the second lens elements so as to prevent the distance therebetween from overly large, thereby reducing assembling problems.

According to the present disclosure, at least one of an object-side surface and the image-side surface of the fifth lens element can have at least two critical points from a paraxial region thereof to an off-axial region thereof. Therefore, it is favorable for balancing the aberration correction at every field of the image so as to improve image quality homogeneously. Furthermore, when the refractive power of the fifth lens element is weak, it is favorable for preventing the shape of the fifth lens element from overly curved so as to reduce manufacturing problems.

Figure 19:
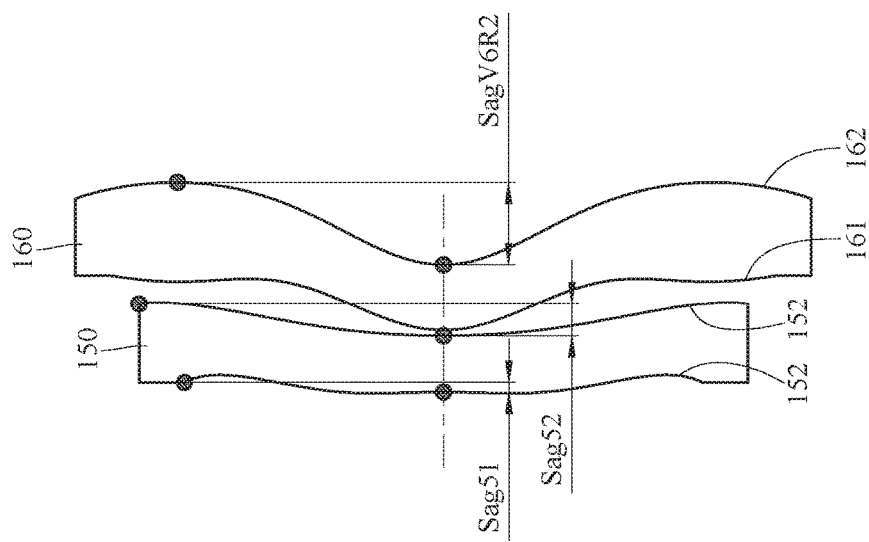
FIG. 19 shows a schematic view of the parameters Sag51, Sag52 and SagV6R2 according to the 1st embodiment of the present disclosure.

When a displacement in parallel with an optical axis from an axial vertex of the object-side surface of the fifth lens element to a maximum effective radius position of the object-side surface of the fifth lens element is Sag51, a displacement in parallel with the optical axis from an axial vertex of the image-side surface of the fifth lens element to a maximum effective radius position of the image-side surface of the fifth lens element is Sag52, a central thickness of the fifth lens element is CT5, the following condition can be satisfied: $0<(|Sag51|+|Sag52|)/CT5<1.25$. Therefore, when the refractive power of the fifth lens element is weak, it is favorable for preventing the shape of the fifth lens element from overly curved so as to increase manufacturing yield rate. As seen in FIG. 19, it shows a schematic view of the parameters Sag51 and Sag52 in FIG. 1. When the displacement in parallel with an optical axis from the axial vertex of the lens surface to the maximum effective radius position of the lens surface is facing towards the image side of the imaging lens assembly, the value of Sag51 or Sag52 is positive; otherwise, the value is negative.

When a maximum image height of the imaging lens assembly (half of a diagonal length of an effective photosensitive area of an image sensor) is ImgH, a curvature radius of an object-side surface of the sixth lens element is R11, a curvature radius of the image-side surface of the sixth lens element is R12, the following condition can be satisfied: $5.5<(ImgH/R11)+(ImgH/R12)<10.0$. Therefore, with a short total track length and a large image surface, it is favorable for reducing the back focal length by properly arranging the sixth lens element.

When the focal length of the first lens element is f1, the focal length of the second lens element is f2, a focal length of the third lens element is f3, the focal length of the fourth lens element is f4, a focal length of the fifth lens element is f5, a focal length of the sixth lens element is f6, a focal length of the x-th lens element is fx, the following condition can be satisfied: $|f4|<|fx|$, wherein x=1, 2, 3, 5, 6. Therefore, it is favorable for strengthening the positive refractive power of the fourth lens element so as to improve the capability for enlarging the field of view.

When a displacement in parallel with the optical axis from an axial vertex of the image-side surface of the sixth lens element to a critical point on the image-side surface of the sixth lens element is SagV6R2, a central thickness of the sixth lens element is CT6, the following condition can be satisfied: $0.75<SagV6R2/CT6<2.5$. Therefore, it is favorable for properly arranging the shape of the image-side surface of the sixth lens element so as to improve the capability for correcting aberrations and reducing the back focal length. As seen in FIG. 19, it shows a schematic view of the parameter SagV6R2 in FIG. 1. When the displacement in parallel with the optical axis from the axial vertex of the lens surface to the critical point on the lens surface is facing towards the image side of the imaging lens assembly, the value of SagV6R2 is positive; otherwise, the value is negative.

When a curvature radius of the object-side surface of the fourth lens element is R7, a curvature radius of the image-side surface of the fourth lens element is R8, the following condition can be satisfied: $1.5<(R7+R8)/(R7-R8)<10$. Therefore, it is favorable for providing the proper shape of the fourth lens element corresponding to the third and the fifth lens elements for simpler lens assembling or molding processes.

When a focal length of the imaging lens assembly is f, an axial distance between an object-side surface of the first lens element and the image surface is TL, half of a maximal field of view of the imaging lens assembly is HFOV, the following condition can be satisfied: $TL/[f*tan(HFOV)]<1.50$. Therefore, it is favorable for reducing the total track length of the imaging lens assembly having a wide field of view so as to maintain a compact size thereof.

When the focal length of the first lens element is f1, the focal length of the second lens element is f2, the focal length of the third lens element is f3, the focal length of the fifth lens element is f5, the focal length of the sixth lens element is f6, a focal length of the y-th lens element is fy, the following condition can be satisfied: $|f6|<|fy|$, wherein y=1, 2, 3, 5. Therefore, it is favorable for correcting aberrations generated by stronger positive refractive power of the fourth lens element. Furthermore, it is favorable for moving a principal point of the imaging lens assembly towards the object side so as to reduce the back focal length while controlling the chief ray angle (CRA) and relative illumination.

Figure 20:
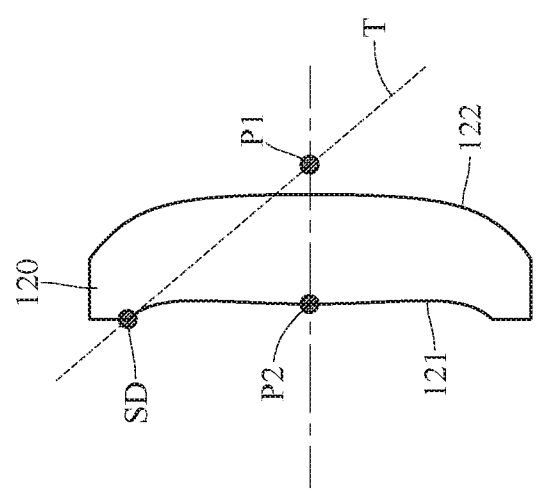
FIG. 20 shows a schematic view of a tangent line to the object-side surface of the second lens element at a maximum effective radius position of the object-side surface thereof, an intersection of the tangent line and an optical axis, and an axial vertex of the object-side surface thereof and the optical axis according to the 1st embodiment of the present disclosure.

According to the present disclosure, there is a tangent line to the object-side surface of the second lens element at the maximum effective radius position of the object-side surface of the second lens element. An intersection of the tangent line and the optical axis can be closer to the image side of the imaging lens assembly than an axial vertex of the object-side surface of the second lens element is to the image side of the imaging lens assembly. Therefore, it is favorable for correcting aberrations at the periphery of the image with a large view angle so as to improve image quality. As seen in FIG. 20, it shows a schematic view of a tangent line to the object-side surface of the second lens element at a maximum effective radius position thereof in FIG. 1. In FIG. 20, there is a tangent line T to the object-side surface of the second lens element at the maximum effective radius position SD of the object-side surface of the second lens element, and an intersection P1 of the tangent line T and the optical axis is closer to the image side of the imaging lens assembly than an axial vertex P2 of the object-side surface of the second lens element.

According to the present disclosure, the lens elements of the imaging lens assembly can be made of glass or plastic material. In detail, in the present disclosure, at least half of the lens elements of the imaging lens assembly can be made of plastic material. That is, at least three of the first lens element, the second lens element, the third lens element, the fourth lens element, the fifth lens element and the sixth lens element can be made of plastic material. When the lens elements are made of glass material, the refractive power distribution of the imaging lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging lens assembly can also be reduced.

According to the present disclosure, each of an object-side surface and an image-side surface of a lens element has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not specified, it indicates that the region of refractive power or focus of the lens element can be in the paraxial region thereof.

According to the present disclosure, a critical point on a surface of a lens element is a non-axial point on the surface thereof where its tangent is perpendicular to the optical axis. Specifically, the critical points mentioned above are not located on the optical axis.

According to the present disclosure, an image surface of the imaging lens assembly on a corresponding image sensor can be flat or curved, particularly a concave curved surface facing towards the object side of the imaging lens assembly.

According to the present disclosure, the imaging lens assembly can include at least one stop, such as an aperture stop, a glare stop or a field stop. Said glare stop or said field stop is allocated for eliminating the stray light and thereby improving image quality.

According to the present disclosure, an aperture stop can be configured as a front stop or a middle stop. A front stop disposed between the imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, an image capturing unit includes the aforementioned imaging lens assembly and image sensor, wherein the image sensor is disposed on the image side and can be located on or near the image surface of the aforementioned imaging lens assembly. In some embodiments, the image capturing unit can further include a barrel member, a holder member or a combination thereof.

Figure 21:
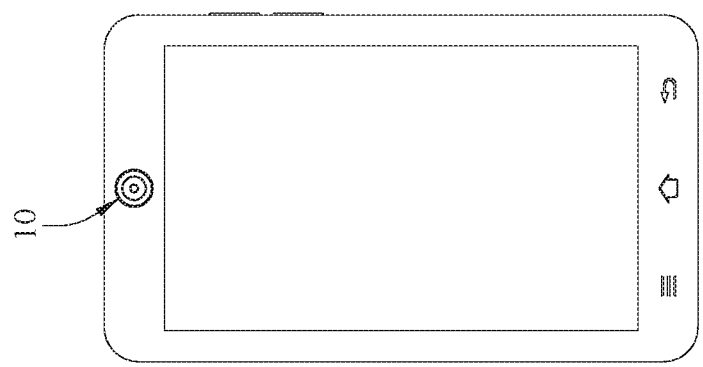
FIG. 21 shows an electronic device according to one embodiment.
Figure 22:
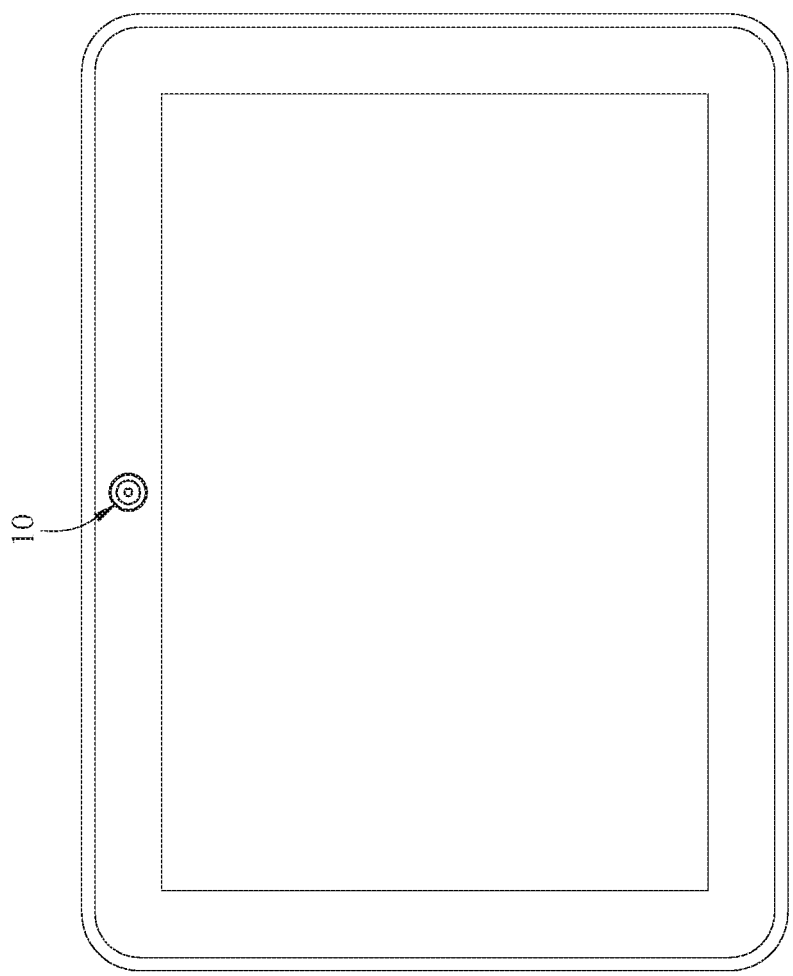
FIG. 22 shows an electronic device according to another embodiment.
Figure 23:
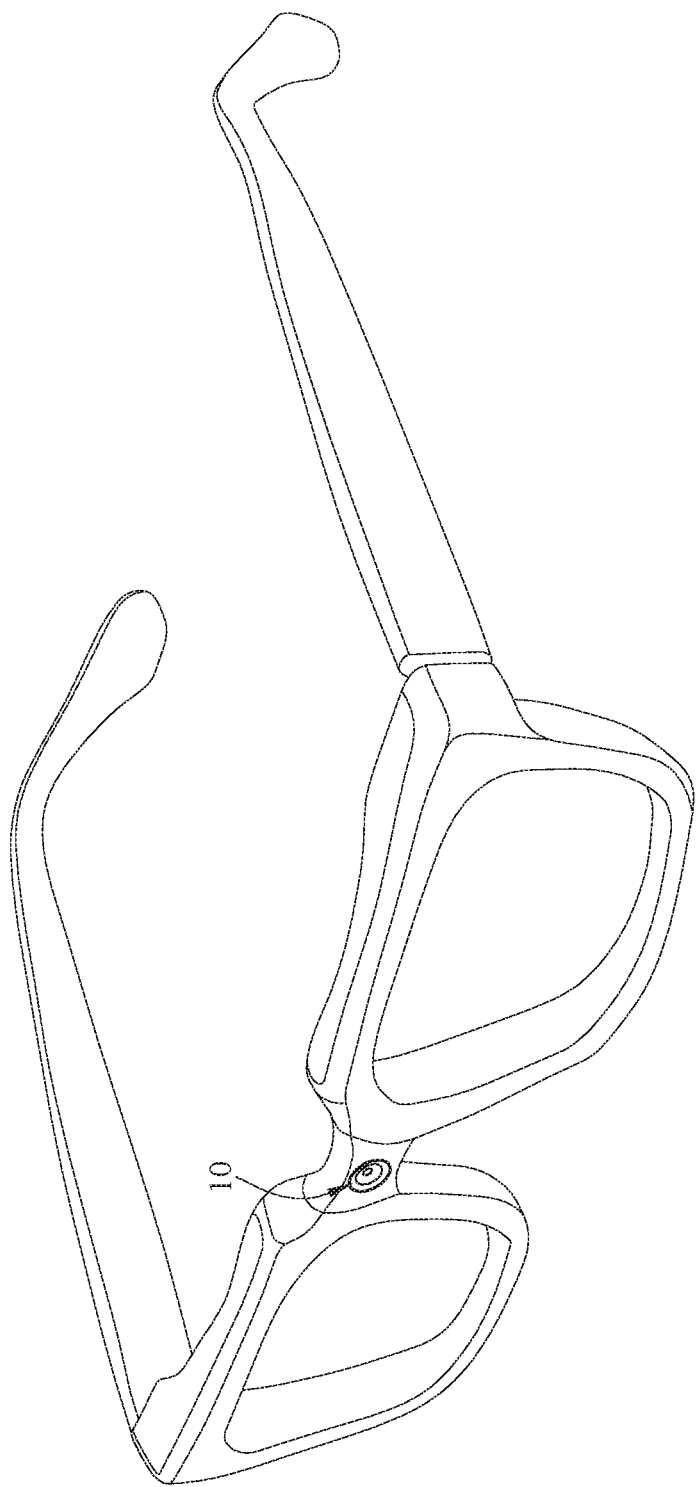
FIG. 23 shows an electronic device according to still another embodiment.

In FIG. 21, FIG. 22 and FIG. 23, an image capturing unit 10 may be installed in, but not limited to, an electronic device, including a smartphone (FIG. 21), a tablet computer (FIG. 22) or a wearable device (FIG. 23). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging lens assembly can be optionally applied to optical systems with a movable focus. Furthermore, the imaging lens assembly is featured with good capability in aberration corrections and high image quality, and can be applied to 3D (three-dimensional) image capturing applications, in products such as such as digital cameras, mobile devices, digital tablets, wearable devices, smart televisions, network surveillance devices, motion sensing input devices, dashboard cameras, vehicle backup cameras and other electronic imaging devices. According to the above description of the present disclosure, the following specific embodiments are provided for further explanation.

1st Embodiment

Figure 2:
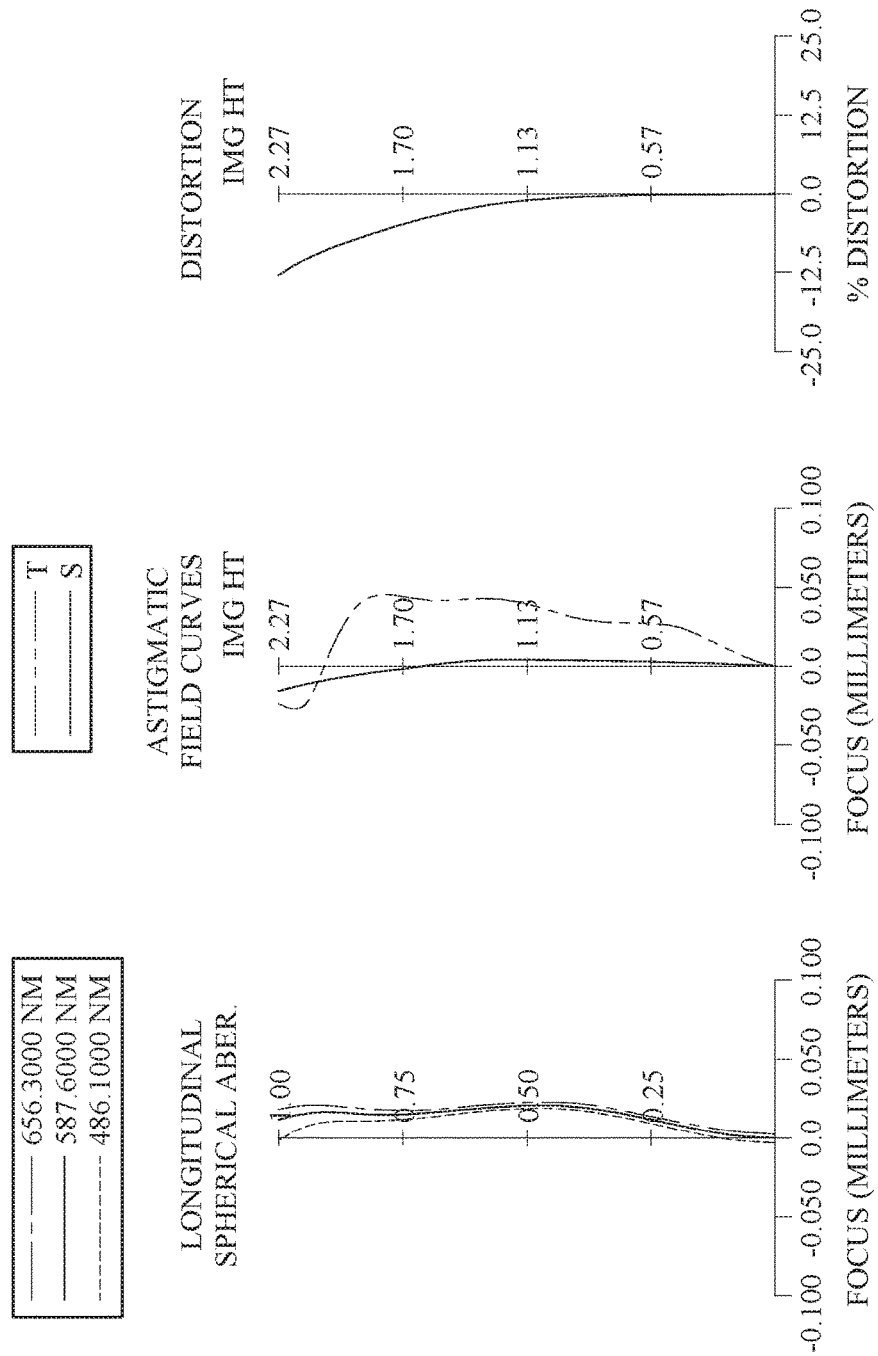
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 190. The imaging lens assembly includes, in order from an object side to an image side, an aperture stop 100, a first lens element 110, a second lens element 120, a stop 101, a third lens element 130, a fourth lens element 140, a fifth lens element 150, a sixth lens element 160, an IR-cut filter 170 and an image surface 180, wherein the imaging lens assembly has a total of six single and non-cemented lens elements (110-160).

The first lens element 110 with positive refractive power has an object-side surface 111 being convex in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric. There is a tangent line to the object-side surface 121 at a maximum effective radius position of the object-side surface 121, and an intersection of the tangent line and an optical axis is closer to the image side of the imaging lens assembly than an axial vertex of the object-side surface 121.

The third lens element 130 with negative refractive power has an object-side surface 131 being concave in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with negative refractive power has an object-side surface 151 being concave in a paraxial region thereof and an image-side surface 152 being concave in a paraxial region thereof. The fifth lens element 150 is made of plastic material and has the object-side surface 151 and the image-side surface 152 being both aspheric.

The sixth lens element 160 with positive refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one convex shape in an off-axial region thereof.

The IR-cut filter 170 is made of glass material and located between the sixth lens element 160 and the image surface 180, and will not affect the focal length of the imaging lens assembly. The image sensor 190 is disposed on or near the image surface 180 of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i} (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens assembly of the image capturing unit according to the 1st embodiment, when a focal length of the imaging lens assembly is f, an f-number of the imaging lens assembly is Fno, and half of a maximal field of view of the imaging lens assembly is HFOV, these parameters have the following values: f=2.03 millimeters (mm); Fno=2.12; and HFOV=52.0 degrees (deg.).

When an axial distance between the first lens element 110 and the second lens element 120 is T12, a central thickness of the second lens element 120 is CT2, the following condition is satisfied: T12/CT2=0.19.

When a sum of axial distances between each adjacent lens element of the imaging lens assembly is ΣAT, an entrance pupil diameter of the imaging lens assembly is EPD, the following condition is satisfied: ΣAT/EPD=0.36.

When the focal length of the imaging lens assembly is f, an axial distance between the object-side surface 111 of the first lens element 110 and the image surface 180 is TL, half of the maximal field of view of the imaging lens assembly is HFOV, the following condition is satisfied: TL/[f*tan(HFOV)]=1.36.

When a maximum image height of the imaging lens assembly is ImgH, a curvature radius of the object-side surface 161 of the sixth lens element 160 is R11, a curvature radius of the image-side surface 162 of the sixth lens element 160 is R12, the following condition is satisfied: (ImgH/R11)+(ImgH/R12)=7.03.

When a curvature radius of the object-side surface 121 of the second lens element 120 is R3, a curvature radius of the image-side surface 122 of the second lens element 120 is R4, the following condition is satisfied: (R3+R4)/(R3−R4)=−0.30.

When a curvature radius of the object-side surface 131 of the third lens element 130 is R5, a curvature radius of the image-side surface 132 of the third lens element 130 is R6, the following condition is satisfied: (R5+R6)/(R5−R6)=0.42.

When a curvature radius of the object-side surface 141 of the fourth lens element 140 is R7, a curvature radius of the image-side surface 142 of the fourth lens element 140 is R8, the following condition is satisfied: (R7+R8)/(R7−R8)=2.36.

When a focal length of the first lens element 110 is f1, a focal length of the second lens element 120 is f2, a focal length of the fourth lens element 140 is f4, the following condition is satisfied: |f4/f1|+|f4/f2|=0.58.

When the focal length of the first lens element 110 is f1, the focal length of the second lens element 120 is f2, the following condition is satisfied: |f1/f2|=1.95.

When a displacement in parallel with the optical axis from an axial vertex of the object-side surface 151 of the fifth lens element 150 to a maximum effective radius position of the object-side surface 151 is Sag51, a displacement in parallel with the optical axis from an axial vertex of the image-side surface 152 of the fifth lens element 150 to a maximum effective radius position of the image-side surface 152 is Sag52, a central thickness of the fifth lens element 150 is CT5, the following condition is satisfied: (|Sag51|+|Sag52|)/CT5=0.73.

When a displacement in parallel with the optical axis from an axial vertex of the image-side surface 162 of the sixth lens element 160 to a critical point on the image-side surface 162 is SagV6R2, a central thickness of the sixth lens element 160 is CT6, the following condition is satisfied: SagV6R2/CT6=1.25.

In this embodiment, the object-side surface 151 of the fifth lens element 150 has two critical points from a paraxial region thereof to an off-axial region thereof, and the image-side surface 152 of the fifth lens element 150 has one critical point from a paraxial region thereof to an off-axial region thereof.

The detailed optical data of the 1st embodiment are shown in Table 1 and the aspheric surface data are shown in Table 2 below.

TABLE 1

1st Embodiment
f = 2.03 mm, Fno = 2.12, HFOV = 52.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.006 | | | | |
| 2 | Lens 1 | 2.954 | (ASP) | 0.299 | Plastic | 1.584 | 28.2 | 8.52 |
| 3 | | 6.996 | (ASP) | 0.062 | | | | |
| 4 | Lens 2 | 3.609 | (ASP) | 0.331 | Plastic | 1.545 | 56.0 | 4.36 |
| 5 | | −6.695 | (ASP) | −0.156 | | | | |
| 6 | Stop | Plano | | 0.274 | | | | |
| 7 | Lens 3 | −12.511 | (ASP) | 0.210 | Plastic | 1.671 | 19.5 | −5.38 |
| 8 | | 5.102 | (ASP) | 0.100 | | | | |
| 9 | Lens 4 | −1.638 | (ASP) | 0.603 | Plastic | 1.545 | 56.0 | 1.68 |
| 10 | | −0.664 | (ASP) | 0.030 | | | | |
| 11 | Lens 5 | −4.610 | (ASP) | 0.300 | Plastic | 1.671 | 19.5 | −3.44 |
| 12 | | 4.732 | (ASP) | 0.030 | | | | |
| 13 | Lens 6 | 0.696 | (ASP) | 0.350 | Plastic | 1.584 | 28.2 | 20.91 |
| 14 | | 0.602 | (ASP) | 0.600 | | | | |
| 15 | IR-cut filter | Plano | | 0.210 | Glass | 1.517 | 64.2 | — |
| 16 | | Plano | | 0.304 | | | | |
| 17 | Image | Plano | | — | | | | |

Note:
Reference wavelength is 587.6 nm (d-line).
An effective radius of the stop 101 (Surface 6) is 0.680 mm.

TABLE 2

Aspheric Coefficients

| | Surface # | | | | | |
|---|---|---|---|---|---|---|
| | 2 | 3 | 4 | 5 | 7 | 8 |
| k = | −1.5111E+00 | −8.1049E+01 | −7.6096E+00 | −9.0000E+01 | −4.6162E+01 | −1.0000E+00 |
| A4 = | −1.5784E−01 | −4.1843E−01 | −3.1754E−01 | −3.9008E−01 | −1.0278E+00 | −4.0936E−01 |
| A6 = | −3.4614E−01 | −1.5914E+00 | −4.6271E−01 | −4.3822E−01 | −7.6196E−01 | −8.1838E−01 |
| A8 = | 1.1619E+00 | 2.1085E+00 | −9.3059E+00 | −1.8943E+00 | −5.6240E+00 | 2.0873E+00 |
| A10 = | −5.7158E+00 | −5.9520E+00 | 3.2854E+01 | 1.1418E+00 | 2.7497E+01 | −1.5944E+00 |
| A12 = | — | — | −6.5941E+01 | 3.4149E−01 | −3.1508E+01 | 5.5749E−01 |
| A14 = | — | — | — | — | 1.0863E+01 | −8.3733E−02 |

| | Surface # | | | | | |
|---|---|---|---|---|---|---|
| | 9 | 10 | 11 | 12 | 13 | 14 |
| k = | −1.9892E+01 | −1.8373E+00 | −1.0000E+00 | −9.0000E+01 | −2.3330E+00 | −1.8130E+00 |
| A4 = | −5.9598E−01 | −2.4243E−01 | 5.3068E−01 | 1.4421E−01 | −2.1208E−01 | −3.7782E−01 |
| A6 = | 2.4856E+00 | 1.8352E−01 | −6.5932E−01 | −1.9745E−01 | −1.3905E−01 | 2.4068E−01 |
| A8 = | −6.1160E+00 | −2.0417E−01 | 5.0037E−01 | 1.5863E−01 | 2.1909E−01 | −9.6948E−02 |
| A10 = | 8.5726E+00 | 3.5809E−01 | −2.6431E−01 | −8.1182E−02 | −1.0374E−01 | 2.4123E−02 |
| A12 = | −6.1872E+00 | 1.7326E−01 | 9.0821E−02 | 2.4594E−02 | 2.4351E−02 | −3.4287E−03 |
| A14 = | 2.1261E+00 | −3.3936E−01 | −1.8692E−02 | −3.9872E−03 | −2.8753E−03 | 2.3850E−04 |
| A16 = | −2.7616E−01 | 9.2511E−02 | 1.6729E−03 | 2.5989E−04 | 1.3453E−04 | −5.6541E−06 |

In Table 1, the curvature radius, the thickness and the focal length are shown in millimeters (mm). Surface numbers 0-17 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are related to the corresponding schematic and aberration curves figures in the drawing, and the definitions of the terms in the tables are the same as Table 1 and Table 2 of the 1st embodiment. Therefore, an explanation in this regard will not be provided again.

2nd Embodiment

Figure 3:
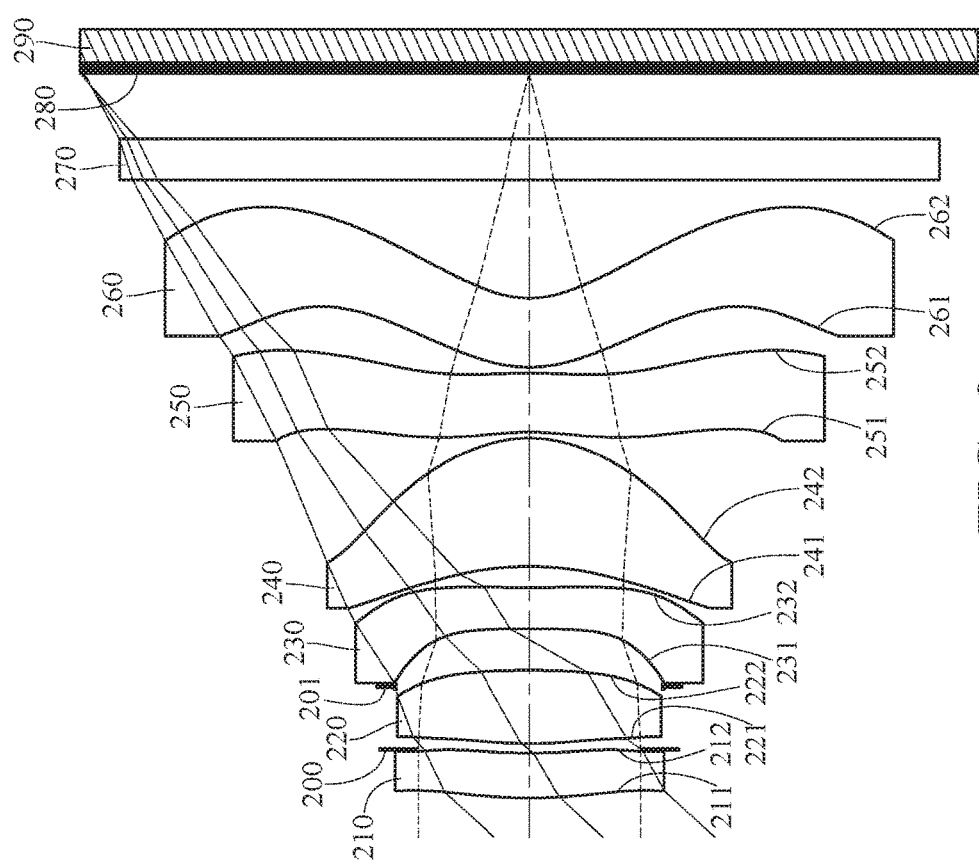
FIG. 3 is a schematic view of an image capturing unit according to the 2nd embodiment of the present disclosure.
Figure 4:
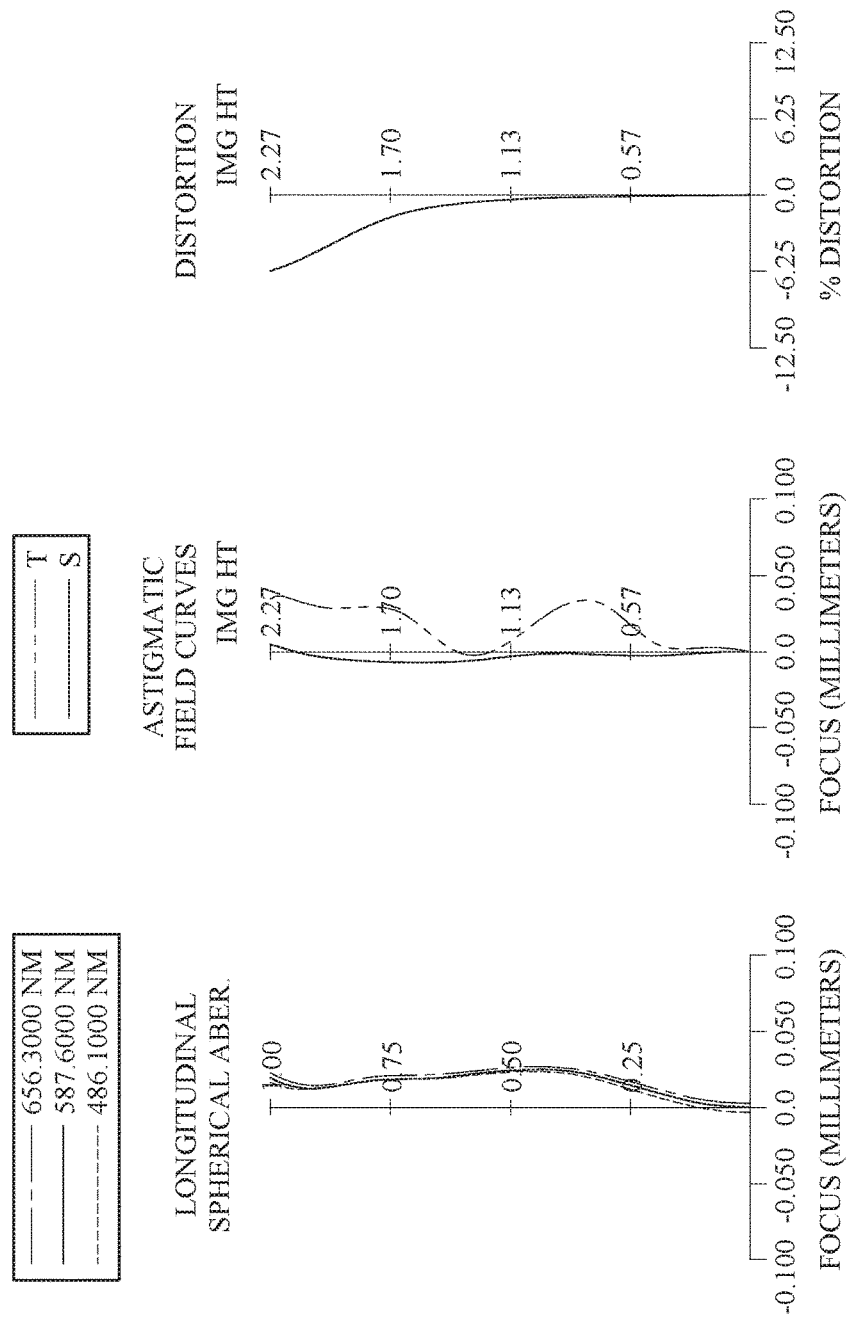
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 290. The imaging lens assembly includes, in order from an object side to an image side, a first lens element 210, an aperture stop 200, a second lens element 220, a stop 201, a third lens element 230, a fourth lens element 240, a fifth lens element 250, a sixth lens element 260, an IR-cut filter 270 and an image surface 280, wherein the imaging lens assembly has a total of six single and non-cemented lens elements (210-260).

The first lens element 210 with positive refractive power has an object-side surface 211 being convex in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of plastic material and has the object-side surface 221 and the image-side surface 222 being both aspheric.

The third lens element 230 with negative refractive power has an object-side surface 231 being concave in a paraxial region thereof and an image-side surface 232 being concave in a paraxial region thereof. The third lens element 230 is made of plastic material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one convex shape in an off-axial region thereof.

The IR-cut filter 270 is made of glass material and located between the sixth lens element 260 and the image surface 280, and will not affect the focal length of the imaging lens assembly. The image sensor 290 is disposed on or near the image surface 280 of the imaging lens assembly.

The detailed optical data of the 2nd embodiment are shown in Table 3 and the aspheric surface data are shown in Table 4 below.

TABLE 3

2nd Embodiment
f = 2.20 mm, Fno = 1.95, HFOV = 47.5 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 2.382 | (ASP) | 0.227 | Plastic | 1.545 | 56.0 | 73.68 |
| 2 |  | 2.447 | (ASP) | 0.019 |  |  |  |  |
| 3 | Ape. Stop | Plano |  | 0.033 |  |  |  |  |
| 4 | Lens 2 | 2.363 | (ASP) | 0.371 | Plastic | 1.544 | 55.9 | 2.98 |
| 5 |  | −4.876 | (ASP) | −0.084 |  |  |  |  |
| 6 | Stop | Plano |  | 0.294 |  |  |  |  |
| 7 | Lens 3 | −13.688 | (ASP) | 0.210 | Plastic | 1.639 | 23.5 | −8.42 |
| 8 |  | 8.911 | (ASP) | 0.106 |  |  |  |  |
| 9 | Lens 4 | −1.695 | (ASP) | 0.654 | Plastic | 1.544 | 55.9 | 1.80 |
| 10 |  | −0.706 | (ASP) | 0.030 |  |  |  |  |
| 11 | Lens 5 | −1.585 | (ASP) | 0.300 | Plastic | 1.660 | 20.4 | −5.34 |
| 12 |  | −3.098 | (ASP) | 0.030 |  |  |  |  |
| 13 | Lens 6 | 0.694 | (ASP) | 0.350 | Plastic | 1.544 | 55.9 | −8.95 |
| 14 |  | 0.500 | (ASP) | 0.600 |  |  |  |  |
| 15 | IR-cut filter | Plano |  | 0.210 | Glass | 1.517 | 64.2 | — |
| 16 |  | Plano |  | 0.331 |  |  |  |  |
| 17 | Image | Plano |  | — |  |  |  |  |

Note:
Reference wavelength is 587.6 nm (d-line).
An effective radius of the stop 201 (Surface 6) is 0.680 mm.

TABLE 4

Aspheric Coefficients

| Surface # | 1 | 2 | 4 | 5 | 7 | 8 |
|---|---|---|---|---|---|---|
| k = | −5.3189E+00 | −2.0713E+01 | −3.7225E+00 | −1.0000E+00 | −9.0000E+01 | −4.3405E+01 |
| A4 = | −2.2600E−01 | −4.5121E−01 | −4.5361E−01 | −3.1427E−01 | −7.4883E−01 | −3.3496E−01 |
| A6 = | 2.6041E−01 | −2.2161E−01 | 1.1137E+00 | −3.5937E−01 | −2.3652E−01 | 1.0210E−01 |
| A8 = | −1.9313E+00 | −8.1567E−01 | −8.9193E+00 | −2.0307E−01 | −7.1075E+00 | −7.5052E−01 |
| A10 = | 2.6804E+00 | 5.1197E+00 | 2.9803E+01 | 1.2992E+00 | 1.9757E+01 | 1.0186E+00 |
| A12 = | — | — | −2.8316E+01 | −6.5211E−01 | −1.9017E+01 | −4.1478E−01 |
| A14 = | — | — | — | — | 6.2666E+00 | 4.4348E−02 |

TABLE 4-continued

Aspheric Coefficients

| Surface # | 9 | 10 | 11 | 12 | 13 | 14 |
|---|---|---|---|---|---|---|
| k = | −5.6444E+01 | −1.5416E+00 | −1.0000E+00 | −2.4531E+01 | −3.1858E+00 | −3.0884E+00 |
| A4 = | −1.4649E+00 | −1.0319E−01 | 1.2804E+00 | 9.4733E−01 | −6.6469E−02 | −7.4584E−02 |
| A6 = | 6.4751E+00 | 3.7528E−01 | −2.1457E+00 | −1.6235E+00 | −1.2648E−01 | −5.4466E−02 |
| A8 = | −1.5247E+01 | −1.5876E+00 | 2.0528E+00 | 1.4534E+00 | 1.1127E−01 | 6.6068E−02 |
| A10 = | 1.9923E+01 | 2.1675E+00 | −1.1953E+00 | −7.7134E−01 | −6.4018E−02 | −3.2286E−02 |
| A12 = | −1.4145E+01 | −9.7154E−01 | 4.1316E−01 | 2.3936E−01 | 2.6472E−02 | 8.0794E−03 |
| A14 = | 5.0182E+00 | 3.8604E−02 | −8.0502E−02 | −3.9781E−02 | −5.7869E−03 | −1.0055E−03 |
| A16 = | −6.8890E−01 | 4.1251E−02 | 6.8445E−03 | 2.6988E−03 | 4.7275E−04 | 4.9285E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.20 | (R5 + R6)/(R5 − R6) | 0.21 |
| Fno | 1.95 | (R7 + R8)/(R7 − R8) | 2.43 |
| HFOV [deg.] | 47.5 | \|f4/f1\| + \|f4/f2\| | 0.63 |
| T12/CT2 | 0.14 | \|f1/f2\| | 24.72 |
| ΣAT/EPD | 0.38 | (\|Sag51\| + \|Sag52\|)/CT5 | 0.42 |
| TL/[f*tan(HFOV)] | 1.53 | SagV6R2/CT6 | 1.32 |
| (ImgH/R11) + (ImgH/R12) | 7.81 | The quantity of critical point on the object-side surface 251 | 2 |
| (R3 + R4)/(R3 − R4) | −0.35 | The quantity of critical point on the image-side surface 252 | 2 |

3rd Embodiment

Figure 5:
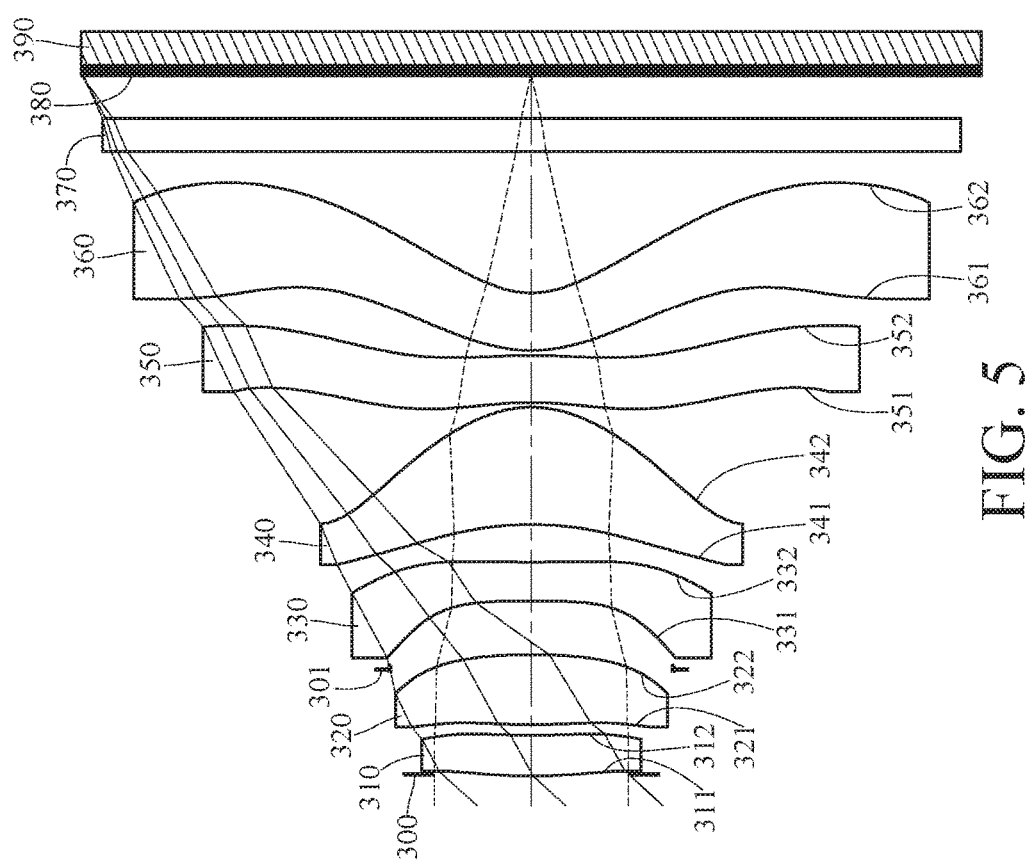
FIG. 5 is a schematic view of an image capturing unit according to the 3rd embodiment of the present disclosure.
Figure 6:
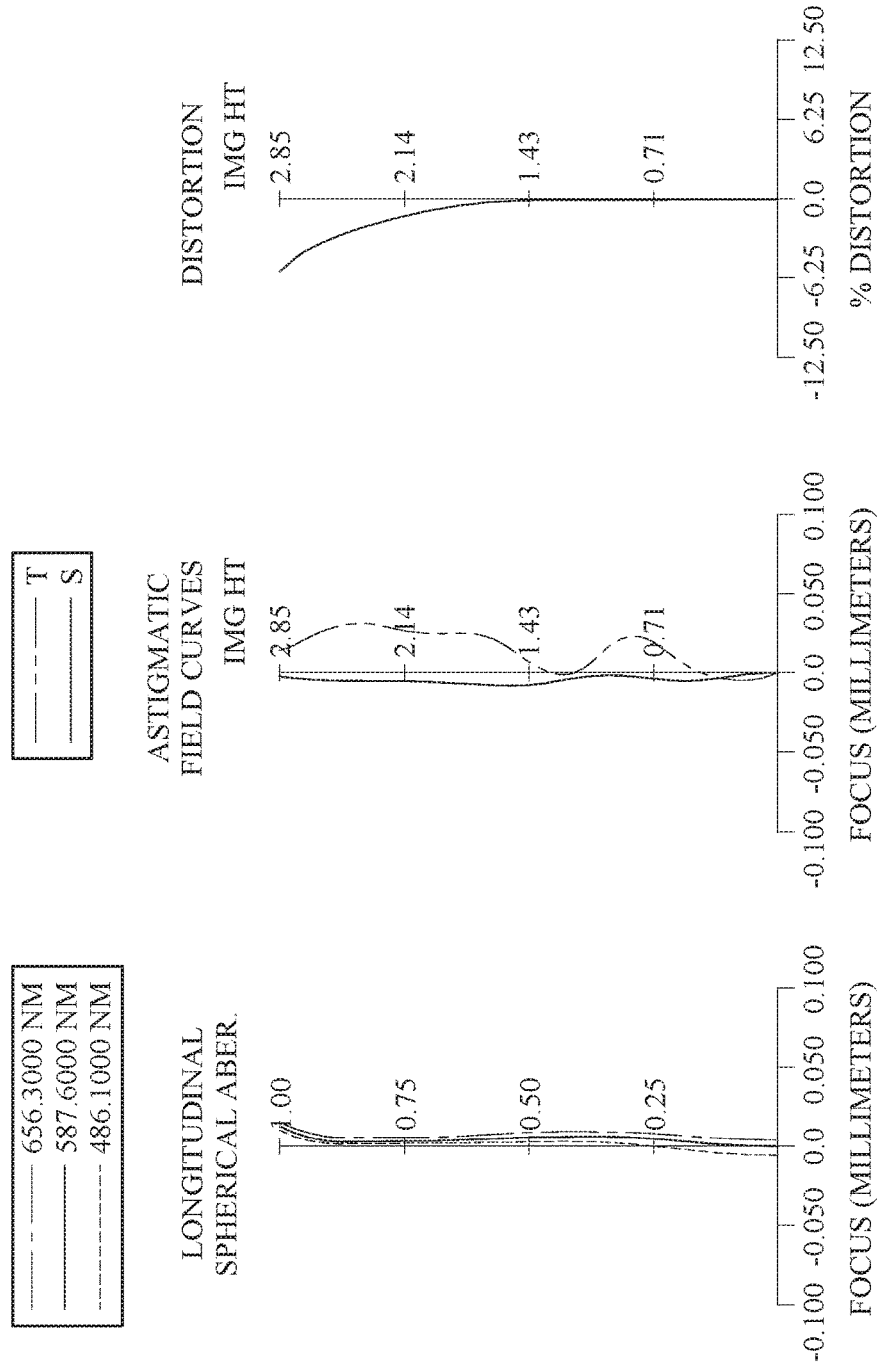
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 390. The imaging lens assembly includes, in order from an object side to an image side, an aperture stop 300, a first lens element 310, a second lens element 320, a stop 301, a third lens element 330, a fourth lens element 340, a fifth lens element 350, a sixth lens element 360, an IR-cut filter 370 and an image surface 380, wherein the imaging lens assembly has a total of six single and non-cemented lens elements (310-360).

The first lens element 310 with positive refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric. There is a tangent line to the object-side surface 321 at a maximum effective radius position of the object-side surface 321, and an intersection of the tangent line and an optical axis is closer to the image side of the imaging lens assembly than an axial vertex of the object-side surface 321.

The third lens element 330 with negative refractive power has an object-side surface 331 being concave in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being concave in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one convex shape in an off-axial region thereof.

The IR-cut filter 370 is made of glass material and located between the sixth lens element 360 and the image surface 380, and will not affect the focal length of the imaging lens assembly. The image sensor 390 is disposed on or near the image surface 380 of the imaging lens assembly.

The detailed optical data of the 3rd embodiment are shown in Table 5 and the aspheric surface data are shown in Table 6 below.

TABLE 5

3rd Embodiment
f = 2.78 mm, Fno = 2.25, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.011 | | | | |
| 2 | Lens 1 | 3.223 (ASP) | 0.258 | Plastic | 1.545 | 56.0 | 19.87 |
| 3 | | 4.461 (ASP) | 0.069 | | | | |
| 4 | Lens 2 | 4.650 (ASP) | 0.443 | Plastic | 1.544 | 55.9 | 4.02 |
| 5 | | −3.991 (ASP) | −0.092 | | | | |
| 6 | Stop | Plano | 0.434 | | | | |
| 7 | Lens 3 | −10.786 (ASP) | 0.250 | Plastic | 1.639 | 23.5 | −6.98 |
| 8 | | 7.661 (ASP) | 0.239 | | | | |
| 9 | Lens 4 | −2.084 (ASP) | 0.745 | Plastic | 1.544 | 55.9 | 1.74 |
| 10 | | −0.733 (ASP) | 0.030 | | | | |
| 11 | Lens 5 | −2.178 (ASP) | 0.300 | Plastic | 1.660 | 20.4 | −10.12 |
| 12 | | −3.407 (ASP) | 0.030 | | | | |
| 13 | Lens 6 | 0.966 (ASP) | 0.369 | Plastic | 1.544 | 55.9 | −3.46 |
| 14 | | 0.552 (ASP) | 0.900 | | | | |
| 15 | IR-cut filter | Plano | 0.210 | Glass | 1.517 | 64.2 | — |
| 16 | | Plano | 0.270 | | | | |
| 17 | Image | Plano | — | | | | |

Note:
Reference wavelength is 587.6 nm (d-line).
An effective radius of the stop 301 (Surface 6) is 0.900 mm.

TABLE 6

Aspheric Coefficients

| Surface # | 2 | 3 | 4 | 5 | 7 | 8 |
|---|---|---|---|---|---|---|
| k = | −2.2885E+01 | −5.4553E+01 | −6.6517E+00 | −1.0000E+00 | −9.0000E+01 | −9.0000E+01 |
| A4 = | −7.7456E−02 | −2.7938E−01 | −2.6025E−01 | −1.8182E−01 | −4.3055E−01 | −1.5268E−01 |
| A6 = | −7.4442E−02 | −1.2968E−01 | 1.0093E−01 | −1.4553E−01 | −4.0284E−01 | −1.6212E−01 |
| A8 = | −3.4038E−01 | −4.1120E−01 | −1.3878E+00 | 2.0998E−02 | −1.1436E+00 | 2.7527E−01 |
| A10 = | 4.2817E−01 | 1.3530E+00 | 3.4741E+00 | 5.1281E−02 | 2.5399E+00 | −1.9481E−01 |
| A12 = | — | — | −2.0603E+00 | −6.2141E−02 | −1.7006E+00 | 7.6210E−02 |
| A14 = | — | — | — | — | 3.5360E−01 | −1.1951E−02 |

| Surface # | 9 | 10 | 11 | 12 | 13 | 14 |
|---|---|---|---|---|---|---|
| k = | −4.2781E+01 | −1.8498E+00 | −1.0000E+00 | −9.0000E+01 | −3.0366E+00 | −2.9844E+00 |
| A4 = | −4.6902E−01 | 5.7317E−04 | 4.2254E−01 | 2.3170E−01 | −7.0618E−02 | −4.2828E−02 |
| A6 = | 9.7989E−01 | −1.8591E−01 | −3.0478E−01 | −1.7046E−01 | 2.1293E−02 | 1.8106E−03 |
| A8 = | −1.0390E+00 | 2.5522E−01 | 1.3807E−01 | 7.0966E−02 | −1.5212E−02 | 1.5224E−03 |
| A10 = | 6.0983E−01 | −1.4282E−01 | −4.2297E−02 | −1.9584E−02 | 6.1833E−03 | −5.6139E−04 |
| A12 = | −1.8817E−01 | 5.5441E−02 | 8.2261E−03 | 3.4475E−03 | −1.1876E−03 | 1.0432E−04 |
| A14 = | 2.5676E−02 | −1.3960E−02 | −8.9349E−04 | −3.4098E−04 | 1.1019E−04 | −1.0151E−05 |
| A16 = | −9.4402E−04 | 1.4436E−03 | 3.9685E−05 | 1.4037E−05 | −4.0774E−06 | 3.8466E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.78 | (R5 + R6)/(R5 − R6) | 0.17 |
| Fno | 2.25 | (R7 + R8)/(R7 − R8) | 2.09 |
| HFOV [deg.] | 47.5 | \|f4/f1\| + \|f4/f2\| | 0.52 |
| T12/CT2 | 0.16 | \|f1/f2\| | 4.94 |
| ΣAT/EPD | 0.57 | (\|Sag51\| + \|Sag52\|)/CT5 | 0.84 |
| TL/[f*tan(HFOV)] | 1.47 | SagV6R2/CT6 | 1.90 |
| (ImgH/R11) + | 8.13 | The quantity of critical point on the | 2 |
| (ImgH/R12) | | object-side surface 351 | |
| (R3 + R4)/ | 0.08 | The quantity of critical point on the | 2 |
| (R3 − R4) | | image-side surface 352 | |

4th Embodiment

Figure 7:
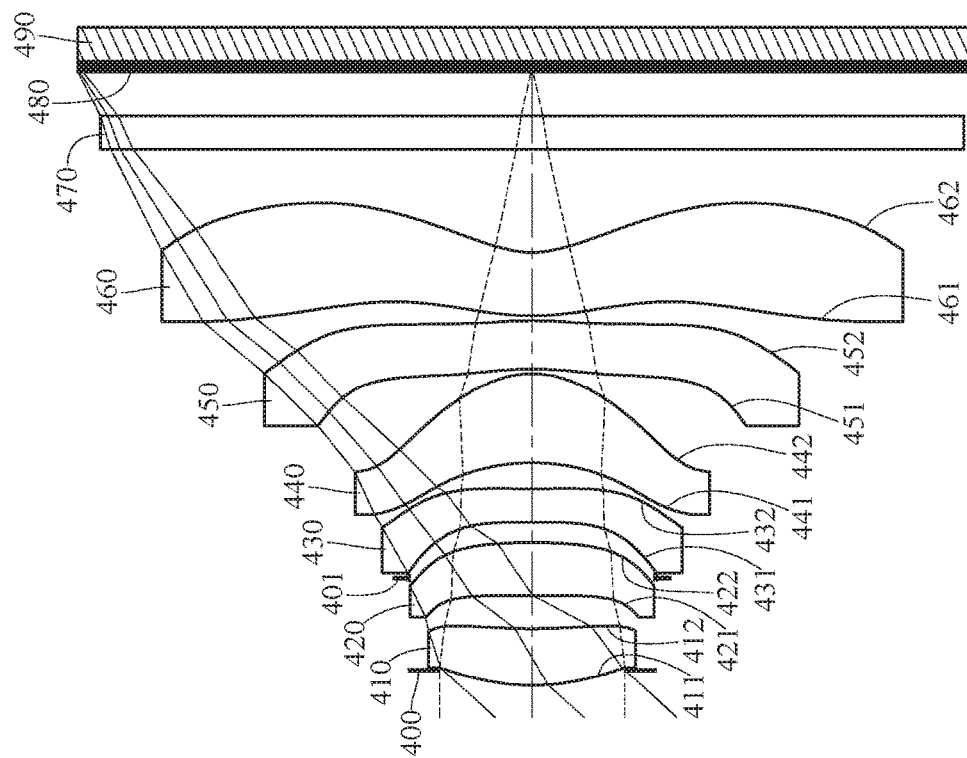
FIG. 7 is a schematic view of an image capturing unit according to the 4th embodiment of the present disclosure.
Figure 8:
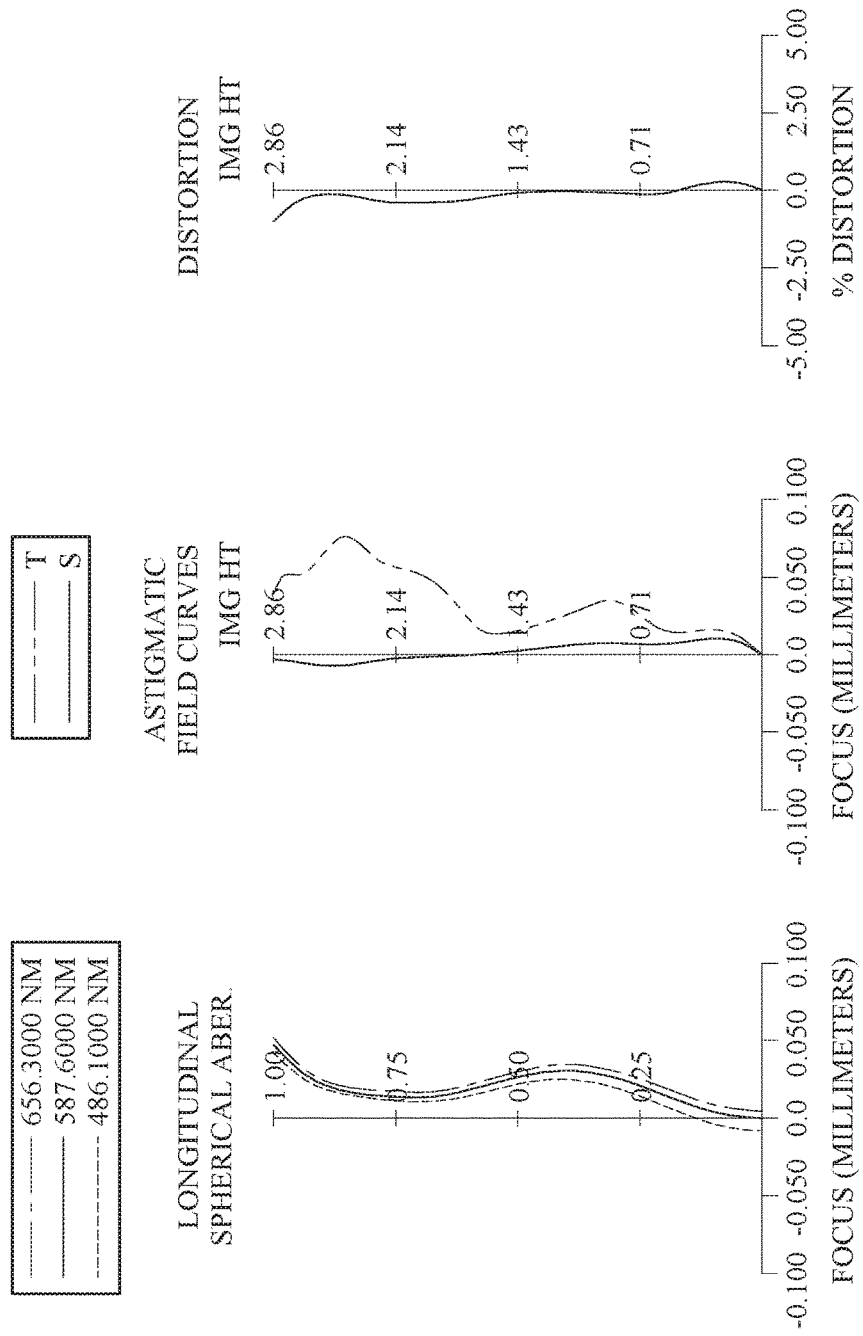
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 490. The imaging lens assembly includes, in order from an object side to an image side, an aperture stop 400, a first lens element 410, a second lens element 420, a stop 401, a third lens element 430, a fourth lens element 440, a fifth lens element 450, a sixth lens element 460, an IR-cut filter 470 and an image surface 480, wherein the imaging lens assembly has a total of six single and non-cemented lens elements (410-460).

The first lens element 410 with positive refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric. There is a tangent line to the object-side surface 421 at a maximum effective radius position of the object-side surface 421, and an intersection of the tangent line and an optical axis is closer to the image side of the imaging lens assembly than an axial vertex of the object-side surface 421.

The third lens element 430 with negative refractive power has an object-side surface 431 being concave in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being concave in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric.

The sixth lens element 460 with negative refractive power has an object-side surface 461 being convex in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one convex shape in an off-axial region thereof.

The IR-cut filter 470 is made of glass material and located between the sixth lens element 460 and the image surface 480, and will not affect the focal length of the imaging lens assembly. The image sensor 490 is disposed on or near the image surface 480 of the imaging lens assembly.

The detailed optical data of the 4th embodiment are shown in Table 7 and the aspheric surface data are shown in Table 8 below.

TABLE 7

4th Embodiment
f = 2.63 mm, Fno = 2.25, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 3 | Ape. Stop | Plano | −0.096 | | | | |
| 1 | Lens 1 | 1.490 (ASP) | 0.359 | Plastic | 1.544 | 55.9 | 4.09 |
| 2 | | 4.133 (ASP) | 0.210 | | | | |
| 4 | Lens 2 | −78.085 (ASP) | 0.333 | Plastic | 1.544 | 55.9 | 7.68 |
| 5 | | −3.969 (ASP) | −0.223 | | | | |
| 12 | Stop | Plano | 0.352 | | | | |
| 6 | Lens 3 | −9.634 (ASP) | 0.210 | Plastic | 1.660 | 20.4 | −8.28 |
| 7 | | 12.737 (ASP) | 0.164 | | | | |
| 8 | Lens 4 | −1.385 (ASP) | 0.566 | Plastic | 1.544 | 55.9 | 1.59 |
| 9 | | −0.608 (ASP) | 0.030 | | | | |
| 10 | Lens 5 | −1.889 (ASP) | 0.305 | Plastic | 1.660 | 20.4 | −17.67 |
| 11 | | −2.399 (ASP) | 0.031 | | | | |
| 13 | Lens 6 | 1.683 (ASP) | 0.400 | Plastic | 1.544 | 55.9 | −2.10 |
| 14 | | 0.623 (ASP) | 0.650 | | | | |
| 15 | IR-cut filter | Plano | 0.210 | Glass | 1.517 | 64.2 | — |
| 16 | | Plano | 0.281 | | | | |
| 17 | Image | Plano | — | | | | |

Note:
Reference wavelength is 587.6 nm (d-line).
An effective radius of the stop 401 (Surface 6) is 0.780 mm.

TABLE 8

Aspheric Coefficients

| Surface # | 2 | 3 | 4 | 5 | 7 | 8 |
|---|---|---|---|---|---|---|
| k = | 2.3463E−01 | −6.7965E+01 | −7.0653E+01 | −4.8860E+00 | −7.7491E+01 | −1.9663E+01 |
| A4 = | −4.8078E−02 | 3.5690E−02 | −2.1832E−01 | −2.4070E−01 | −5.3793E−01 | −2.9213E−01 |
| A6 = | 1.4444E−01 | −7.3079E−01 | −5.1989E−02 | −1.7557E+00 | −2.1730E+00 | −1.1728E+00 |

TABLE 8-continued

Aspheric Coefficients

| A8 = | −3.3621E−01 | 1.3498E+00 | −4.6280E+00 | 7.6808E+00 | 8.3442E+00 | 3.9447E+00 |
|---|---|---|---|---|---|---|
| A10 = | −4.8617E+00 | −5.0855E+00 | 2.0961E+01 | −2.1155E+01 | −1.8615E+01 | −7.3085E+01 |
| A12 = | 2.0333E+01 | 5.9161E+00 | −5.8975E+01 | 2.7062E+01 | 2.3563E+01 | 8.3459E+00 |
| A14 = | −2.6560E+01 | −4.8690E+00 | 5.6053E+01 | −1.2598E+01 | −1.4426E+01 | −5.2799E+00 |
| A16 = | — | — | — | — | 3.2392E+00 | 1.4684E+00 |

| Surface # | 9 | 10 | 11 | 12 | 13 | 14 |
|---|---|---|---|---|---|---|
| k = | −5.1578E+00 | −2.0774E+00 | −1.0105E+00 | −8.9996E+01 | −1.4550E+00 | −5.0926E+00 |
| A4 = | −4.2776E−01 | −2.1823E−01 | 6.9700E−01 | 2.8646E−01 | −3.3011E−01 | −1.4201E−01 |
| A6 = | 9.0488E−01 | 5.2652E−01 | −1.0776E+00 | −5.1478E−01 | 1.6823E−01 | 8.4899E−02 |
| A8 = | −3.5518E+00 | −1.9230E+00 | 9.1440E−01 | 4.7209E−01 | −4.6874E−02 | −4.0194E−02 |
| A10 = | 8.3249E+00 | 3.0320E+00 | −4.2695E−01 | −2.6487E−01 | 7.5741E−03 | 1.2516E−02 |
| A12 = | −8.8765E+00 | −1.7343E+00 | 5.9658E−02 | 8.4783E−02 | −6.7439E−04 | −2.2894E−03 |
| A14 = | 4.4181E+00 | 1.9638E−01 | 1.7831E−02 | −1.3935E−02 | 2.9130E−05 | 2.1959E−04 |
| A16 = | −8.5912E−01 | 7.7773E−02 | −4.5293E−03 | 8.9983E−04 | −4.8732E−07 | −8.4857E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.63 | (R5 + R6)/(R5 − R6) | −0.14 |
| Fno | 2.25 | (R7 + R8)/(R7 − R8) | 2.57 |
| HFOV [deg.] | 47.5 | \|f4/f1\| + \|f4/f2\| | 0.60 |
| T12/CT2 | 0.63 | \|f1/f2\| | 0.53 |
| ΣAT/EPD | 0.48 | (\|Sag51\| + \|Sag52\|)/CT5 | 2.27 |
| TL/[f*tan(HFOV)] | 1.35 | SagV6R2/CT6 | 0.78 |
| (ImgH/R11) + (ImgH/R12) | 6.28 | The quantity of critical point on the object-side surface 451 | 0 |
| (R3 + R4)/(R3 − R4) | 1.11 | The quantity of critical point on the image-side surface 452 | 0 |

5th Embodiment

Figure 9:
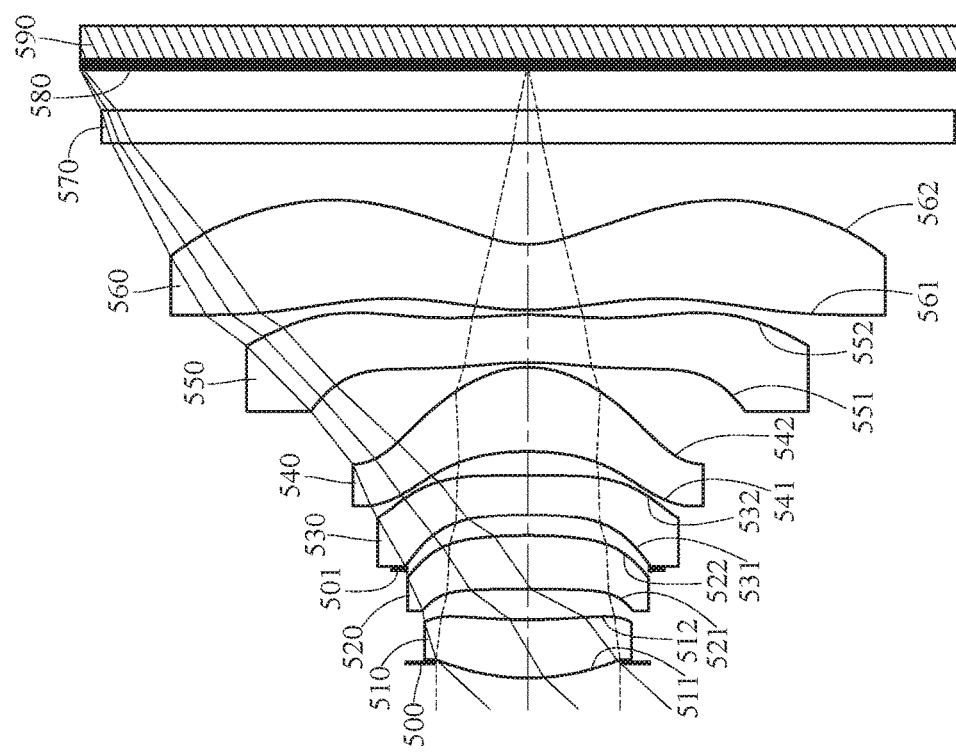
FIG. 9 is a schematic view of an image capturing unit according to the 5th embodiment of the present disclosure.
Figure 10:
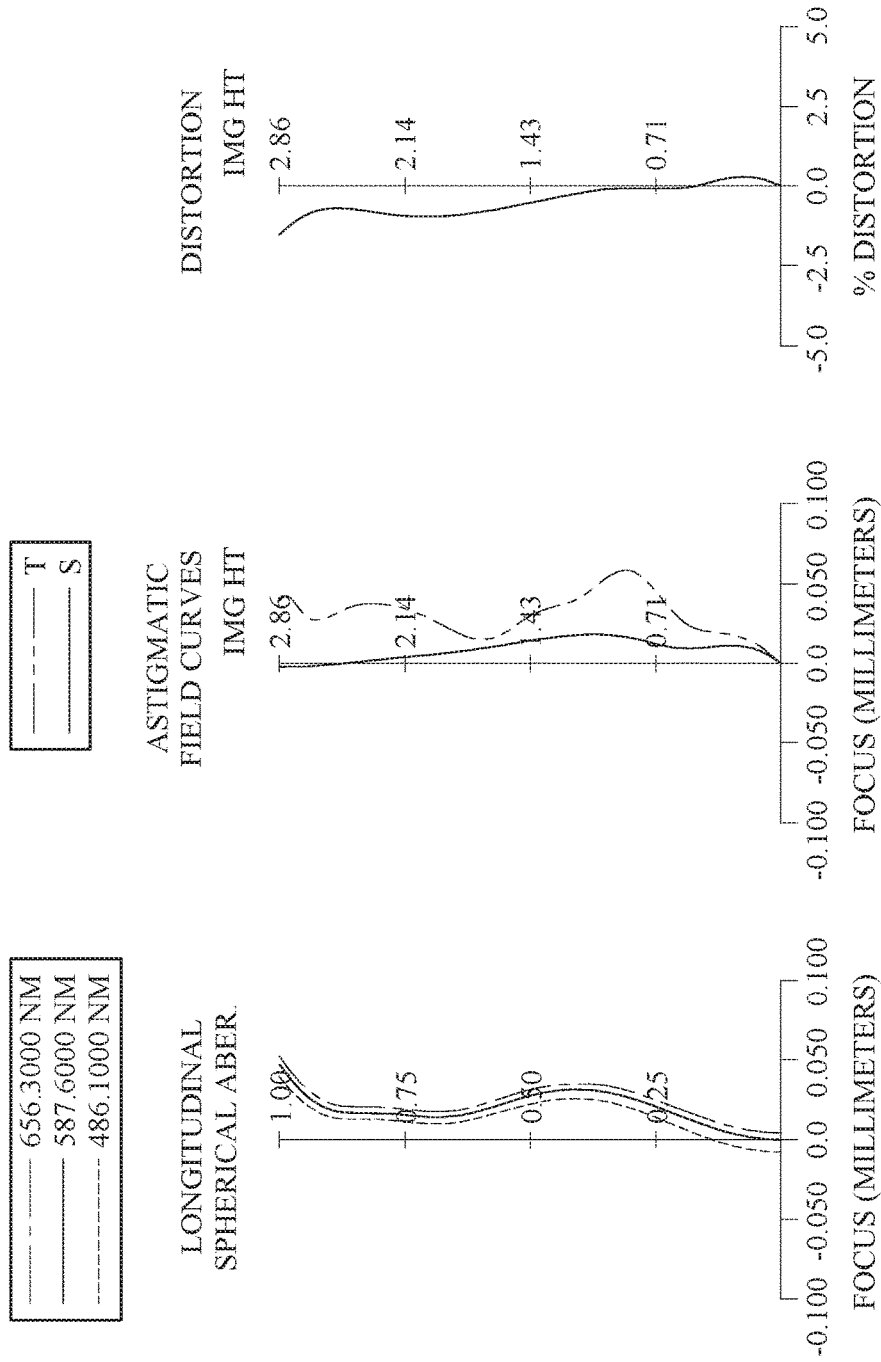
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 590. The imaging lens assembly includes, in order from an object side to an image side, an aperture stop 500, a first lens element 510, a second lens element 520, a stop 501, a third lens element 530, a fourth lens element 540, a fifth lens element 550, a sixth lens element 560, an IR-cut filter 570 and an image surface 580, wherein the imaging lens assembly has a total of six single and non-cemented lens elements (510-560).

The first lens element 510 with positive refractive power has an object-side surface 511 being convex in a paraxial region thereof and an image-side surface 512 being concave in a paraxial region thereof. The first lens element 510 is made of plastic material and has the object-side surface 511 and the image-side surface 512 being both aspheric.

The second lens element 520 with positive refractive power has an object-side surface 521 being convex in a paraxial region thereof and an image-side surface 522 being convex in a paraxial region thereof. The second lens element 520 is made of plastic material and has the object-side surface 521 and the image-side surface 522 being both aspheric. There is a tangent line to the object-side surface 521 at a maximum effective radius position of the object-side surface 521, and an intersection of the tangent line and an optical axis is closer to the image side of the imaging lens assembly than an axial vertex of the object-side surface 521.

The third lens element 530 with negative refractive power has an object-side surface 531 being concave in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with positive refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one convex shape in an off-axial region thereof.

The IR-cut filter 570 is made of glass material and located between the sixth lens element 560 and the image surface 580, and will not affect the focal length of the imaging lens assembly. The image sensor 590 is disposed on or near the image surface 580 of the imaging lens assembly.

The detailed optical data of the 5th embodiment are shown in Table 9 and the aspheric surface data are shown in Table 10 below.

TABLE 9

5th Embodiment
f = 2.65 mm, Fno = 2.25, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.099 | | | | |
| 2 | Lens 1 | 1.482 (ASP) | 0.373 | Plastic | 1.544 | 55.9 | 4.16 |
| 3 | | 3.921 (ASP) | 0.193 | | | | |
| 4 | Lens 2 | 212.307 (ASP) | 0.345 | Plastic | 1.544 | 55.9 | 7.31 |
| 5 | | −4.046 (ASP) | −0.217 | | | | |
| 6 | Stop | Plano | 0.349 | | | | |
| 7 | Lens 3 | −5.240 (ASP) | 0.254 | Plastic | 1.660 | 20.4 | −6.04 |
| 8 | | 16.965 (ASP) | 0.154 | | | | |
| 9 | Lens 4 | −1.798 (ASP) | 0.538 | Plastic | 1.544 | 55.9 | 1.70 |
| 10 | | −0.674 (ASP) | 0.030 | | | | |
| 11 | Lens 5 | −2.317 (ASP) | 0.305 | Plastic | 1.660 | 20.4 | 271.68 |
| 12 | | −2.407 (ASP) | 0.030 | | | | |
| 13 | Lens 6 | 1.902 (ASP) | 0.420 | Plastic | 1.544 | 55.9 | −1.99 |
| 14 | | 0.635 (ASP) | 0.650 | | | | |
| 15 | IR-cut filter | Plano | 0.210 | Glass | 1.517 | 64.2 | — |
| 16 | | Plano | 0.257 | | | | |
| 17 | Image | Plano | — | | | | |

Note:
Reference wavelength is 587.6 nm (d-line).
An effective radius of the stop 501 (Surface 6) is 0.780 mm.

TABLE 10

Aspheric Coefficients

| Surface # | 2 | 3 | 4 | 5 | 7 | 8 |
|---|---|---|---|---|---|---|
| k = | 1.8630E+00 | −6.7965E+01 | −7.0653E+01 | −4.8860E+00 | −7.7491E+01 | −1.9663E+01 |
| A4 = | −6.8888E−02 | 6.2564E−02 | −2.5162E−01 | −2.0825E−01 | −6.6501E−01 | −5.3579E−01 |
| A6 = | −4.8205E−01 | −7.7961E−01 | 8.0584E−01 | −1.2789E+00 | −2.0282E−01 | 5.0073E−01 |
| A8 = | 4.3644E+00 | 1.7363E+00 | −1.2193E+01 | 3.6628E+00 | 2.6971E−01 | −1.4266E+00 |
| A10 = | −2.4683E+01 | −6.9137E+00 | 5.3190E+01 | −9.2547E+00 | −4.0071E+00 | 2.4991E+00 |
| A12 = | 6.1533E+01 | 9.7064E+00 | −1.2672E+02 | 9.5236E+00 | 1.1270E+01 | −2.3536E+00 |
| A14 = | −6.0214E+01 | −8.3154E+00 | 1.1059E+02 | −1.6768E+00 | −1.0482E+01 | 1.2548E+00 |
| A16 = | — | — | — | — | 3.2392E+00 | −2.6066E−01 |

| Surface # | 9 | 10 | 11 | 12 | 13 | 14 |
|---|---|---|---|---|---|---|
| k = | −1.9480E+00 | −2.0371E+00 | −1.9306E+00 | −8.9996E+01 | −1.6048E+01 | −5.0926E+00 |
| A4 = | −4.7533E−01 | −4.0321E−01 | 4.7267E−01 | 2.7810E−01 | −1.2464E−01 | −1.5330E−01 |
| A6 = | 3.4410E−01 | 1.0898E+00 | −5.4359E−01 | −3.0920E−01 | 2.8187E−02 | 8.6297E−02 |
| A8 = | −9.8454E−01 | −3.4355E+00 | 3.4250E−01 | 1.7834E−01 | 1.0830E−02 | −3.9290E−02 |
| A10 = | 3.2639E+00 | 5.8448E+00 | −1.4450E−01 | −7.1643E−02 | −6.7758E−03 | 1.1894E−02 |
| A12 = | −3.5255E+00 | −4.6340E+00 | 2.4296E−02 | 1.8822E−02 | 1.4366E−03 | −2.1240E−03 |
| A14 = | 1.5158E+00 | 1.7014E+00 | 2.3753E−03 | −2.7139E−03 | −1.4140E−04 | 1.9887E−04 |
| A16 = | −2.2540E−01 | −2.3103E−01 | −8.0690E−04 | 1.5529E−04 | 5.3887E−06 | −7.4637E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.65 | (R5 + R6)/(R5 − R6) | −0.53 |
| Fno | 2.25 | (R7 + R8)/(R7 − R8) | 2.20 |
| HFOV [deg.] | 47.5 | |f4/f1| + |f4/f2| | 0.64 |
| T12/CT2 | 0.56 | |f1/f2| | 0.57 |
| ΣAT/EPD | 0.46 | (|Sag51| + |Sag52|)/CT5 | 1.67 |
| TL/[f*tan(HFOV)] | 1.34 | SagV6R2/CT6 | 0.68 |

-continued

| 5th Embodiment | | | |
|---|---|---|---|
| (ImgH/R11) + (ImgH/R12) | 6.00 | The quantity of critical point on the object-side surface 551 | 0 |
| (R3 + R4)/ (R3 − R4) | 0.96 | The quantity of critical point on the image-side surface 552 | 2 |

6th Embodiment

Figure 11:
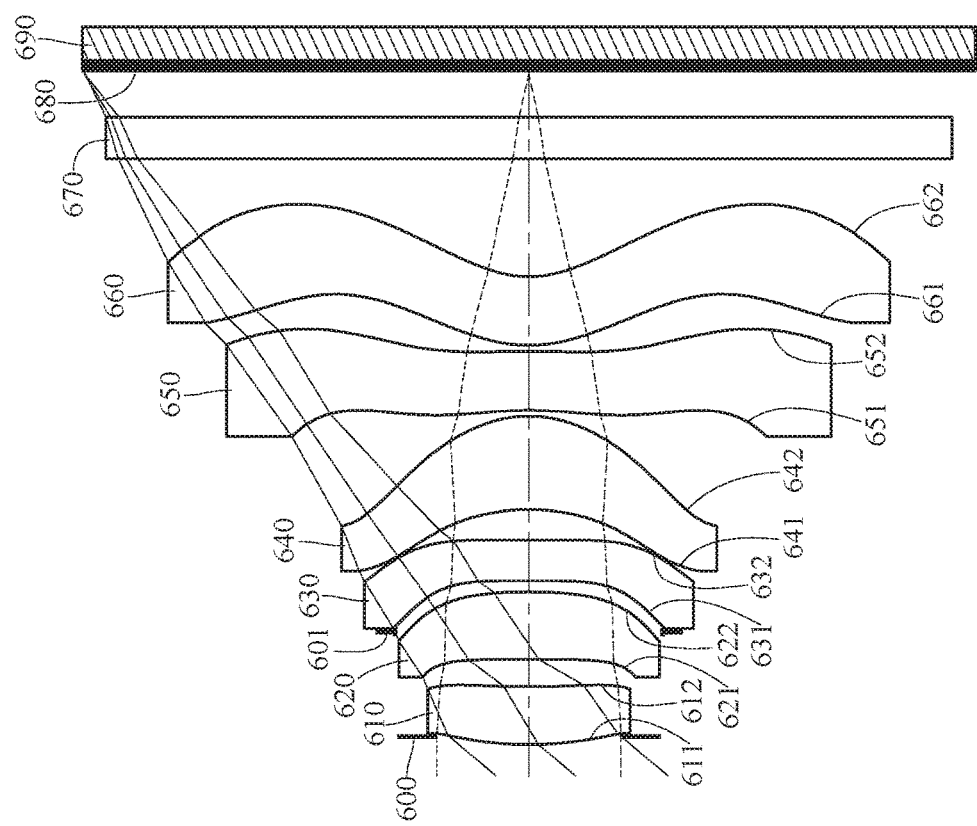
FIG. 11 is a schematic view of an image capturing unit according to the 6th embodiment of the present disclosure.
Figure 12:
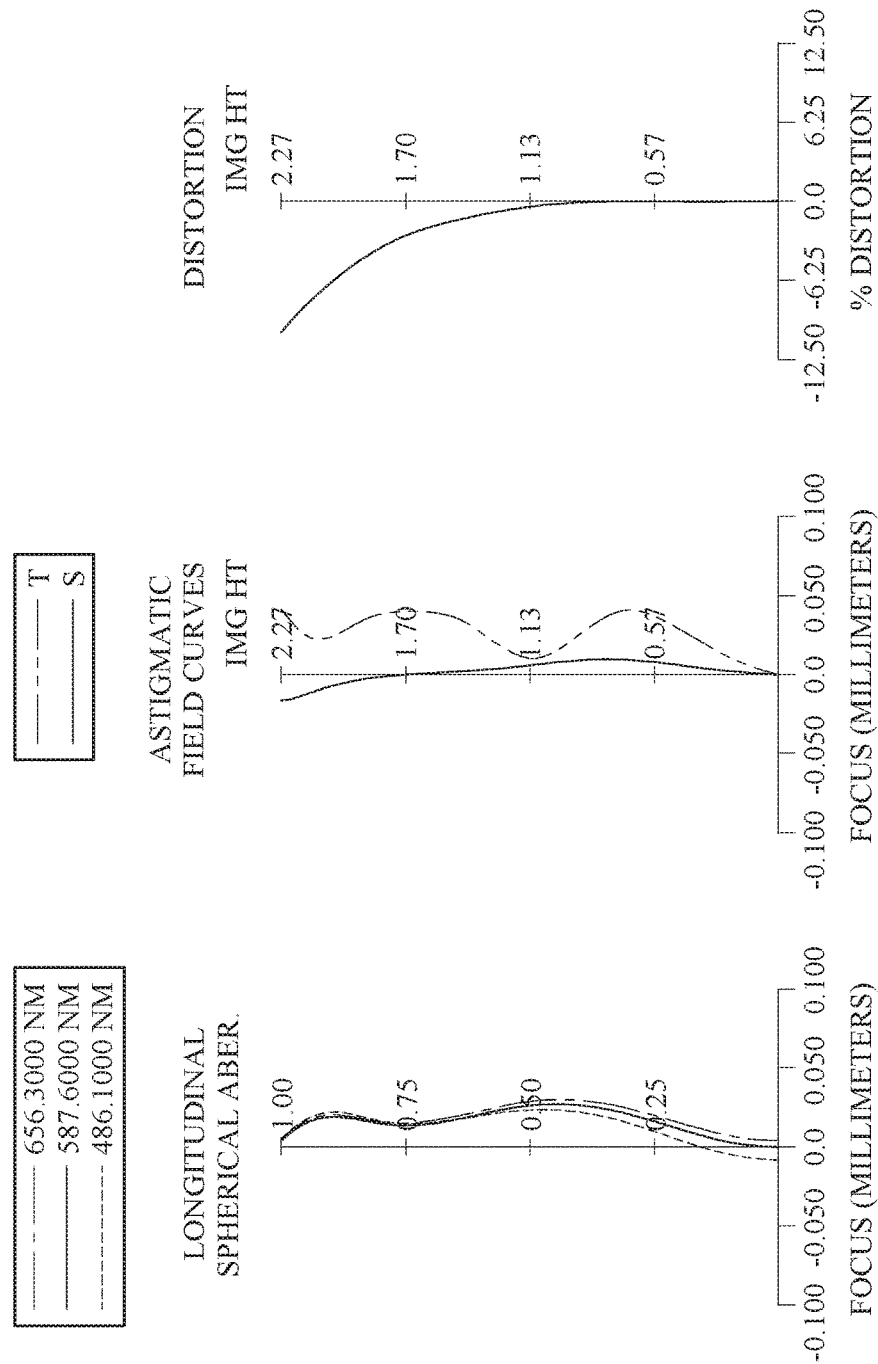
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 690. The imaging lens assembly includes, in order from an object side to an image side, an aperture stop 600, a first lens element 610, a second lens element 620, a stop 601, a third lens element 630, a fourth lens element 640, a fifth lens element 650, a sixth lens element 660, an IR-cut filter 670 and an image surface 680, wherein the imaging lens assembly has a total of six single and non-cemented lens elements (610-660).

The first lens element 610 with positive refractive power has an object-side surface 611 being convex in a paraxial region thereof and an image-side surface 612 being concave in a paraxial region thereof. The first lens element 610 is made of plastic material and has the object-side surface 611 and the image-side surface 612 being both aspheric.

The second lens element 620 with positive refractive power has an object-side surface 621 being concave in a paraxial region thereof and an image-side surface 622 being convex in a paraxial region thereof. The second lens element 620 is made of plastic material and has the object-side surface 621 and the image-side surface 622 being both aspheric. There is a tangent line to the object-side surface 621 at a maximum effective radius position of the object-side surface 621, and an intersection of the tangent line and an optical axis is closer to the image side of the imaging lens assembly than an axial vertex of the object-side surface 621.

The third lens element 630 with negative refractive power has an object-side surface 631 being concave in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one convex shape in an off-axial region thereof.

The IR-cut filter 670 is made of glass material and located between the sixth lens element 660 and the image surface 680, and will not affect the focal length of the imaging lens assembly. The image sensor 690 is disposed on or near the image surface 680 of the imaging lens assembly.

The detailed optical data of the 6th embodiment are shown in Table 11 and the aspheric surface data are shown in Table 12 below.

TABLE 11

6th Embodiment
f = 2.11 mm, Fno = 2.25, HFOV = 50.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.041 | | | | |
| 2 | Lens 1 | 1.710 (ASP) | 0.295 | Plastic | 1.544 | 55.9 | 4.88 |
| 3 | | 4.522 (ASP) | 0.138 | | | | |
| 4 | Lens 2 | −31.903 (ASP) | 0.343 | Plastic | 1.544 | 55.9 | 5.33 |
| 5 | | −2.666 (ASP) | −0.206 | | | | |
| 6 | Stop | Plano | 0.263 | | | | |
| 7 | Lens 3 | −41.170 (ASP) | 0.210 | Plastic | 1.660 | 20.4 | −41.60 |
| 8 | | 82.566 (ASP) | 0.154 | | | | |
| 9 | Lens 4 | −1.049 (ASP) | 0.474 | Plastic | 1.544 | 55.9 | 2.12 |
| 10 | | −0.636 (ASP) | 0.030 | | | | |
| 11 | Lens 5 | −1.916 (ASP) | 0.300 | Plastic | 1.660 | 20.4 | −5.24 |
| 12 | | −4.562 (ASP) | 0.030 | | | | |
| 13 | Lens 6 | 0.735 (ASP) | 0.351 | Plastic | 1.544 | 55.9 | −7.86 |
| 14 | | 0.522 (ASP) | 0.600 | | | | |
| 15 | IR-cut filter | Plano | 0.210 | Glass | 1.517 | 64.2 | — |
| 16 | | Plano | 0.233 | | | | |
| 17 | Image | Plano | — | | | | |

Note:
Reference wavelength is 587.6 nm (d-line).
An effective radius of the stop 601 (Surface 6) is 0.680 mm.

TABLE 12

Aspheric Coefficients

| Surface # | 2 | 3 | 4 | 5 | 7 | 8 |
|---|---|---|---|---|---|---|
| k = | 1.1227E−01 | −6.7961E+01 | −7.0655E+01 | −4.9796E+00 | −7.7490E+01 | −1.9667E+01 |
| A4 = | −1.0941E−01 | −7.8108E−02 | −2.6449E−01 | −7.2635E−01 | −9.9047E−01 | −1.0025E−01 |
| A6 = | 5.3349E−02 | −1.8743E+00 | −3.8029E−01 | 1.4110E−01 | 9.3876E−01 | −1.9836E+00 |

TABLE 12-continued

| Aspheric Coefficients | | | | | | |
|---|---|---|---|---|---|---|
| A8 = | −9.9990E−01 | 4.8748E+00 | −8.8640E+00 | −4.9022E+00 | −1.3936E+01 | 3.4926E+00 |
| A10 = | −1.4105E+00 | −1.7086E+01 | 2.9980E+01 | 1.0819E+01 | 4.0528E+01 | −2.5855E+00 |
| A12 = | — | — | −8.1729E+01 | −5.7105E+00 | −3.9333E+01 | 1.0140E+00 |
| A14 = | — | — | — | — | 1.2303E+01 | −1.7925E−01 |

| Surface # | 9 | 10 | 11 | 12 | 13 | 14 |
|---|---|---|---|---|---|---|
| k = | −9.3044E+00 | −1.8890E+00 | −1.0000E+00 | −9.0000E+01 | −3.5270E+00 | −3.2662E+00 |
| A4 = | −7.9895E−01 | −4.3540E−01 | 8.7550E−01 | 7.3665E−01 | −2.6085E−02 | −1.0634E−01 |
| A6 = | −3.3396E−01 | 8.2790E−01 | −9.6562E−01 | −1.0980E+00 | −2.7820E−01 | −6.0750E−02 |
| A8 = | 3.1577E+00 | −3.2875E+00 | 3.0659E−01 | 8.1088E−01 | 2.2953E−01 | 7.2415E−02 |
| A10 = | −1.1328E+00 | 7.3319E+00 | 1.7739E−01 | −3.6224E−01 | −8.2246E−02 | −3.0312E−02 |
| A12 = | −3.0123E+00 | −6.8167E+00 | −2.1787E−01 | 9.8377E−02 | 1.5369E−02 | 5.9642E−03 |
| A14 = | 2.5245E+00 | 2.8247E+00 | 8.0030E−02 | −1.4842E−02 | −1.4225E−03 | −5.1013E−04 |
| A16 = | −5.3553E−01 | −4.3816E−01 | −1.0088E−02 | 9.3709E−04 | 4.7712E−05 | 1.2843E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.11 | (R5 + R6)/(R5 − R6) | −0.33 |
| Fno | 2.25 | (R7 + R8)/(R7 − R8) | 4.08 |
| HFOV [deg.] | 50.1 | |f4/f1| + |f4/f2| | 0.83 |
| T12/CT2 | 0.40 | |f1/f2| | 0.92 |
| ΣAT/EPD | 0.44 | (|Sag51| + |Sag52|)/CT5 | 0.55 |
| TL/[f*tan(HFOV)] | 1.36 | SagV6R2/CT6 | 1.05 |
| (ImgH/R11) + (ImgH/R12) | 7.43 | The quantity of critical point on the object-side surface 651 | 2 |
| (R3 + R4)/(R3 − R4) | 1.18 | The quantity of critical point on the image-side surface 652 | 2 |

7th Embodiment

Figure 13:
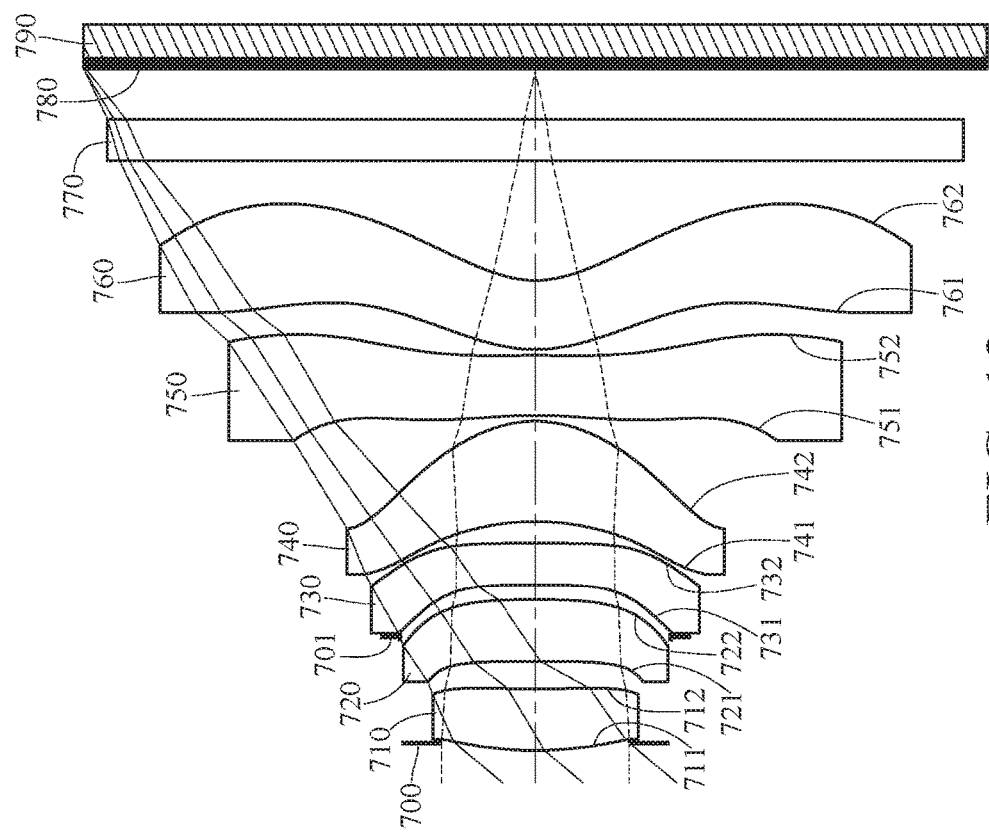
FIG. 13 is a schematic view of an image capturing unit according to the 7th embodiment of the present disclosure.
Figure 14:
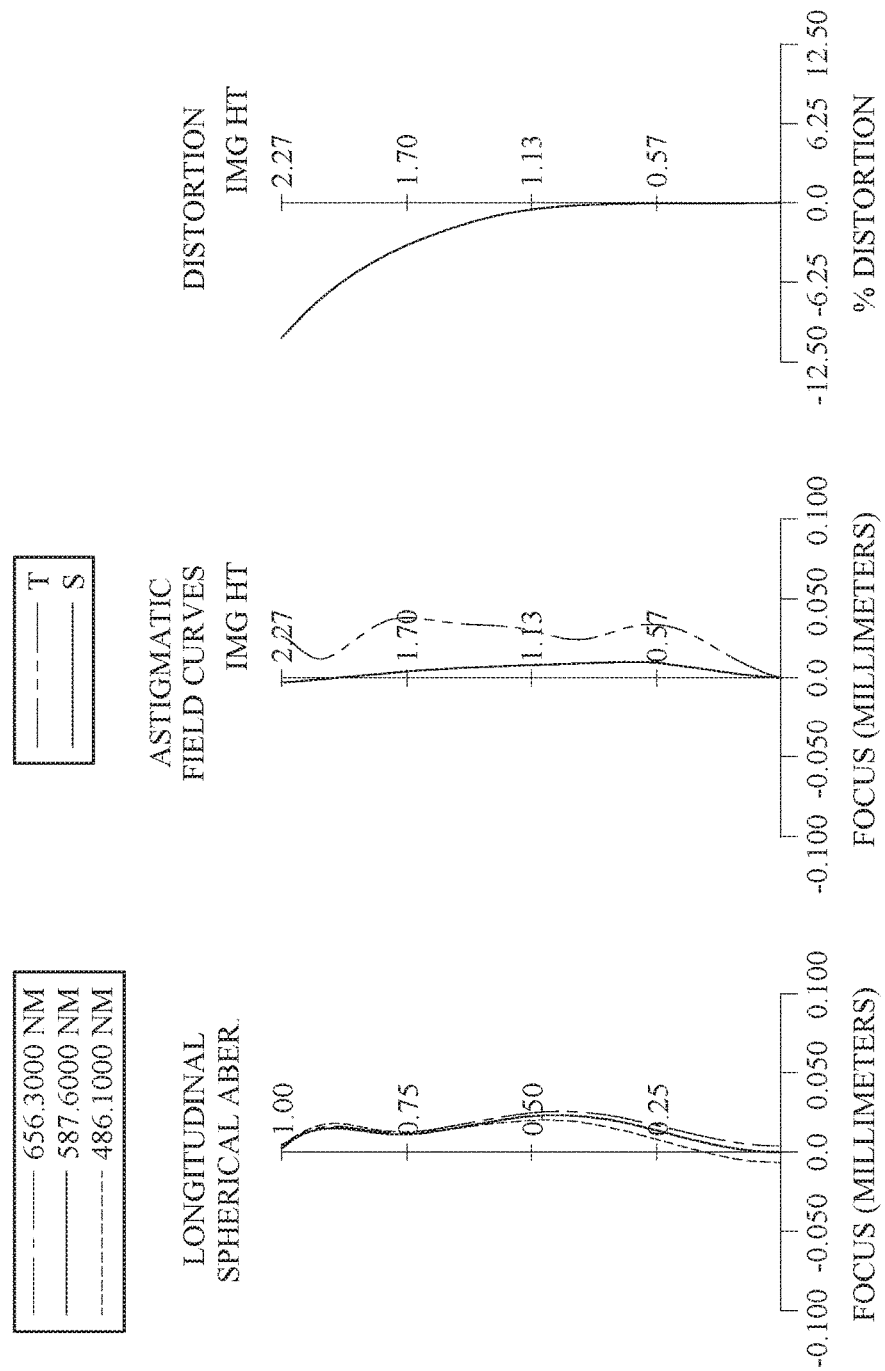
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 790. The imaging lens assembly includes, in order from an object side to an image side, an aperture stop 700, a first lens element 710, a second lens element 720, a stop 701, a third lens element 730, a fourth lens element 740, a fifth lens element 750, a sixth lens element 760, an IR-cut filter 770 and an image surface 780, wherein the imaging lens assembly has a total of six single and non-cemented lens elements (710-760).

The first lens element 710 with positive refractive power has an object-side surface 711 being convex in a paraxial region thereof and an image-side surface 712 being concave in a paraxial region thereof. The first lens element 710 is made of plastic material and has the object-side surface 711 and the image-side surface 712 being both aspheric.

The second lens element 720 with positive refractive power has an object-side surface 721 being concave in a paraxial region thereof and an image-side surface 722 being convex in a paraxial region thereof. The second lens element 720 is made of plastic material and has the object-side surface 721 and the image-side surface 722 being both aspheric. There is a tangent line to the object-side surface 721 at a maximum effective radius position of the object-side surface 721, and an intersection of the tangent line and an optical axis is closer to the image side of the imaging lens assembly than an axial vertex of the object-side surface 721.

The third lens element 730 with negative refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one convex shape in an off-axial region thereof.

The IR-cut filter 770 is made of glass material and located between the sixth lens element 760 and the image surface 780, and will not affect the focal length of the imaging lens assembly. The image sensor 790 is disposed on or near the image surface 780 of the imaging lens assembly.

The detailed optical data of the 7th embodiment are shown in Table 13 and the aspheric surface data are shown in Table 14 below.

TABLE 13

7th Embodiment
f = 2.12 mm, Fno = 2.25, HFOV = 50.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.039 | | | | |
| 2 | Lens 1 | 1.764 (ASP) | 0.309 | Plastic | 1.544 | 55.9 | 4.29 |
| 3 | | 6.813 (ASP) | 0.138 | | | | |
| 4 | Lens 2 | −30.623 (ASP) | 0.311 | Plastic | 1.544 | 55.9 | 11.50 |
| 5 | | −5.211 (ASP) | −0.190 | | | | |
| 6 | Stop | Plano | 0.265 | | | | |
| 7 | Lens 3 | −15.369 (ASP) | 0.210 | Plastic | 1.660 | 20.4 | −87.87 |
| 8 | | −21.025 (ASP) | 0.109 | | | | |
| 9 | Lens 4 | −1.251 (ASP) | 0.503 | Plastic | 1.544 | 55.9 | 1.75 |
| 10 | | −0.617 (ASP) | 0.030 | | | | |
| 11 | Lens 5 | −2.315 (ASP) | 0.300 | Plastic | 1.660 | 20.4 | −4.30 |
| 12 | | −13.185 (ASP) | 0.030 | | | | |
| 13 | Lens 6 | 0.767 (ASP) | 0.350 | Plastic | 1.544 | 55.9 | −6.32 |
| 14 | | 0.527 (ASP) | 0.600 | | | | |
| 15 | IR-cut filter | Plano | 0.210 | Glass | 1.517 | 64.2 | — |
| 16 | | Plano | 0.250 | | | | |
| 17 | Image | Plano | — | | | | |

Note:
Reference wavelength is 587.6 nm (d-line).
An effective radius of the stop 701 (Surface 6) is 0.680 mm.

TABLE 14

Aspheric Coefficients

| Surface # | 2 | 3 | 4 | 5 | 7 | 8 |
|---|---|---|---|---|---|---|
| k = | 1.1208E−01 | −6.7961E+01 | −7.0655E+01 | −4.9796E+00 | −7.7490E+01 | −1.9667E+01 |
| A4 = | −8.7272E−02 | −2.2576E−01 | −4.1162E−01 | −7.2948E−01 | −1.0077E+00 | −1.3796E−01 |
| A6 = | −1.7396E−01 | −1.3368E+00 | 2.0746E+00 | −1.0429E+00 | −5.6722E+00 | −1.8547E+00 |
| A8 = | 2.3792E−01 | 2.4798E+00 | −1.2693E+01 | −2.2165E+00 | −5.1437E+00 | 2.9833E+00 |
| A10 = | −4.2769E+00 | −1.3105E+01 | 4.3879E+01 | 3.0756E+00 | 2.3541E+01 | −1.3726E+00 |
| A12 = | — | — | −1.0888E+02 | −9.2686E−01 | −2.5822E+01 | 4.5341E−02 |
| A14 = | — | — | — | — | 8.6298E+00 | 6.3880E−02 |

| Surface # | 9 | 10 | 11 | 12 | 13 | 14 |
|---|---|---|---|---|---|---|
| k = | −9.3054E+00 | −2.0648E+00 | −1.0000E+00 | −1.0000E+00 | −3.9587E+00 | −3.1490E+00 |
| A4 = | −4.7640E−01 | −4.3383E−01 | 6.8343E−01 | 4.9129E−01 | −1.2613E−01 | −1.8820E−01 |
| A6 = | 9.6533E−01 | 9.4187E−01 | −8.6515E−01 | −6.7320E−01 | −9.7457E−02 | 9.3910E−02 |
| A8 = | −5.6247E+00 | −3.2421E+00 | 5.3191E−01 | 4.7051E−01 | 1.2309E−01 | −4.3243E−02 |
| A10 = | 1.6037E+01 | 6.3978E+00 | −1.9425E−01 | −2.0550E−01 | −5.1549E−02 | 1.5783E−02 |
| A12 = | −1.8694E+01 | −5.3684E+00 | 2.3409E−02 | 5.6487E−02 | 1.0909E−02 | −3.9139E−03 |
| A14 = | 9.3099E+00 | 1.9900E+00 | 8.1232E−03 | −8.8210E−03 | −1.1615E−03 | 5.4103E−04 |
| A16 = | −1.6407E+00 | −2.7281E−01 | −2.0814E−03 | 5.7794E−04 | 4.7968E−05 | −3.0044E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.12 | (R5 + R6)/(R5 − R6) | −6.44 |
| Fno | 2.25 | (R7 + R8)/(R7 − R8) | 2.95 |
| HFOV [deg.] | 50.0 | \|f4/f1\| + \|f4/f2\| | 0.56 |
| T12/CT2 | 0.44 | \|f1/f2\| | 0.37 |
| ΣAT/EPD | 0.41 | (\|Sag51\| + \|Sag52\|)/CT5 | 0.65 |
| TL/[f*tan(HFOV)] | 1.35 | SagV6R2/CT6 | 1.10 |
| (ImgH/R11) + | 7.26 | The quantity of critical point on the | 2 |
| (ImgH/R12) | | object-side surface 751 | |
| (R3 + R4)/ | 1.41 | The quantity of critical point on the | 2 |
| (R3 − R4) | | image-side surface 752 | |

8th Embodiment

Figure 15:
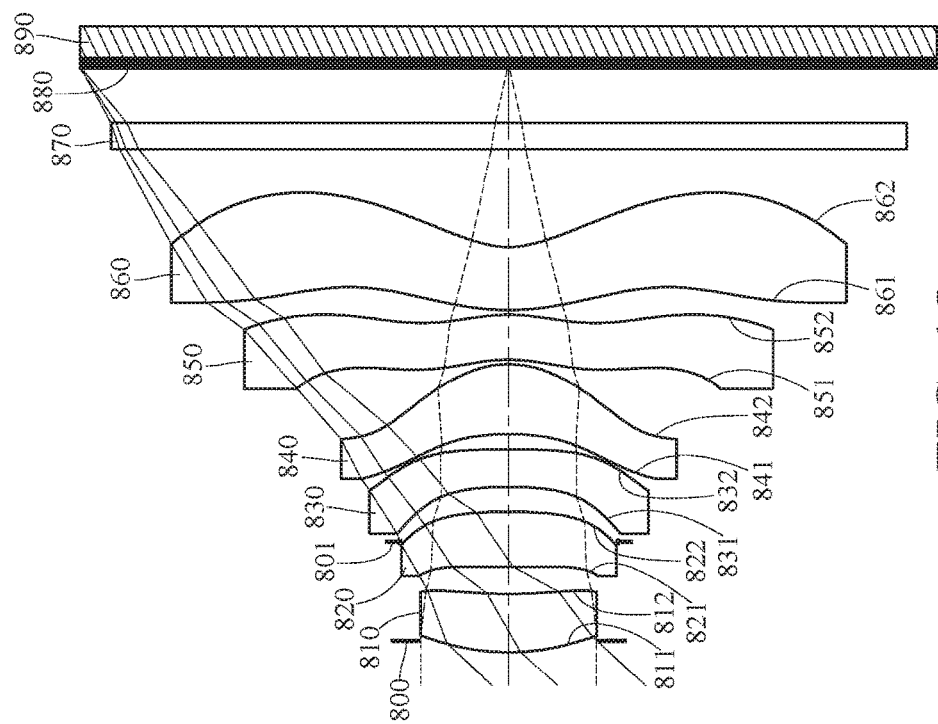
FIG. 15 is a schematic view of an image capturing unit according to the 8th embodiment of the present disclosure.
Figure 16:
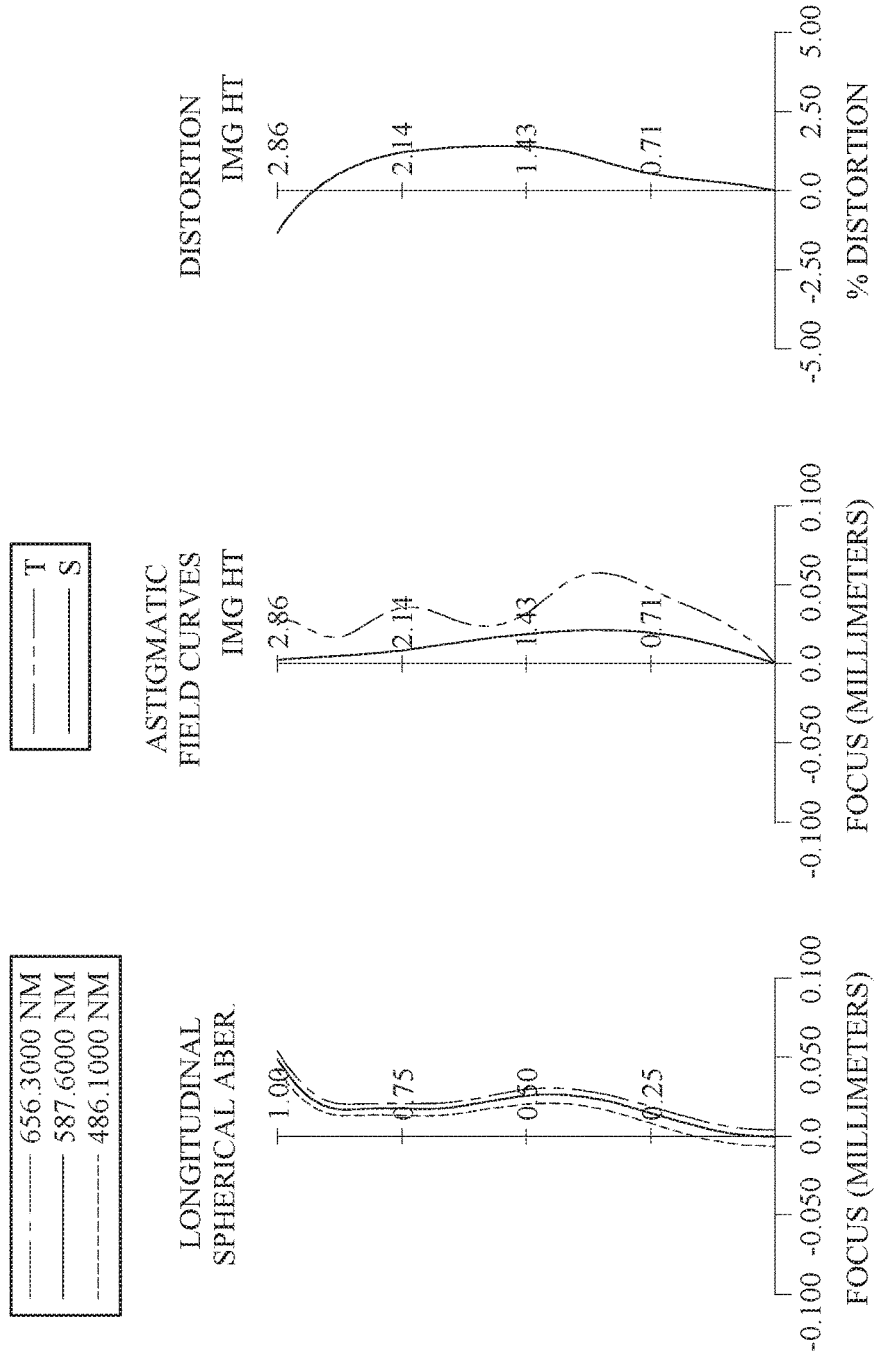
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 890. The imaging lens assembly includes, in order from an object side to an image side, an aperture stop 800, a first lens element 810, a second lens element 820, a stop 801, a third lens element 830, a fourth lens element 840, a fifth lens element 850, a sixth lens element 860, an IR-cut filter 870 and an image surface 880, wherein the imaging lens assembly has a total of six single and non-cemented lens elements (810-860).

The first lens element 810 with positive refractive power has an object-side surface 811 being convex in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric. There is a tangent line to the object-side surface 821 at a maximum effective radius position of the object-side surface 821, and an intersection of the tangent line and an optical axis is closer to the image side of the imaging lens assembly than an axial vertex of the object-side surface 821.

The third lens element 830 with negative refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one convex shape in an off-axial region thereof.

The IR-cut filter 870 is made of glass material and located between the sixth lens element 860 and the image surface 880, and will not affect the focal length of the imaging lens assembly. The image sensor 890 is disposed on or near the image surface 880 of the imaging lens assembly.

The detailed optical data of the 8th embodiment are shown in Table 15 and the aspheric surface data are shown in Table 16 below.

TABLE 15

8th Embodiment
f = 2.64 mm, Fno = 2.25, HFOV = 47.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.077 | | | | |
| 2 | Lens 1 | 1.518 (ASP) | 0.391 | Plastic | 1.545 | 56.0 | 4.49 |
| 3 | | 3.642 (ASP) | 0.180 | | | | |
| 4 | Lens 2 | 22.080 (ASP) | 0.366 | Plastic | 1.544 | 55.9 | 5.57 |
| 5 | | −3.491 (ASP) | −0.200 | | | | |
| 6 | Stop | Plano | 0.365 | | | | |
| 7 | Lens 3 | −2.687 (ASP) | 0.250 | Plastic | 1.660 | 20.4 | −4.87 |
| 8 | | −16.950 (ASP) | 0.102 | | | | |
| 9 | Lens 4 | −1.860 (ASP) | 0.470 | Plastic | 1.544 | 55.9 | 1.60 |
| 10 | | −0.646 (ASP) | 0.030 | | | | |
| 11 | Lens 5 | −1.029 (ASP) | 0.300 | Plastic | 1.639 | 23.5 | 26.01 |
| 12 | | −1.079 (ASP) | 0.030 | | | | |
| 13 | Lens 6 | 1.650 (ASP) | 0.420 | Plastic | 1.544 | 55.9 | −1.97 |
| 14 | | 0.592 (ASP) | 0.650 | | | | |
| 15 | IR-cut filter | Plano | 0.175 | Glass | 1.517 | 64.2 | — |
| 16 | | Plano | 0.370 | | | | |
| 17 | Image | Plano | — | | | | |

Note:
Reference wavelength is 587.6 nm (d-line).
An effective radius of the stop 801 (Surface 6) is 0.725 mm.

TABLE 16

Aspheric Coefficients

| Surface # | 2 | 3 | 4 | 5 | 7 | 8 |
|---|---|---|---|---|---|---|
| k = | 2.3107E+00 | −5.0751E+01 | −3.3676E+01 | −1.5304E+00 | −4.5041E+01 | −4.0271E+01 |
| A4 = | −7.7362E−02 | 2.6838E−02 | −2.6954E−01 | −2.2916E−01 | −8.4050E−01 | −6.0893E−01 |
| A6 = | −6.3465E−01 | −7.3598E−01 | 4.1394E−01 | −1.4362E+00 | 4.8170E−01 | 1.4348E+00 |

TABLE 16-continued

| Aspheric Coefficients | | | | | | |
|---|---|---|---|---|---|---|
| A8 = | 4.8446E+00 | 1.4763E+00 | −8.4159E+00 | 4.6024E+00 | −4.4411E+00 | −5.3489E+00 |
| A10 = | −2.4860E+01 | −6.2637E+01 | 3.3983E+01 | −1.3023E+01 | 9.3953E+01 | 1.1012E+01 |
| A12 = | 5.9240E+01 | 9.3229E+00 | −8.0356E+01 | 1.8790E+01 | −9.3574E−01 | −1.2030E+01 |
| A14 = | −5.7298E+01 | −8.8763E+00 | 6.7577E+01 | −9.8957E+00 | −1.0726E+01 | 6.5936E+00 |
| A16 = | — | — | — | — | 6.5498E+00 | −1.3109E+00 |

| Surface # | 9 | 10 | 11 | 12 | 13 | 14 |
|---|---|---|---|---|---|---|
| k = | −3.7113E+00 | −2.2169E+00 | −5.9844E+00 | −1.0435E+01 | −3.1976E+00 | −4.7838E+00 |
| A4 = | −9.3342E−01 | −2.8670E−01 | 7.9471E−01 | 6.6659E−01 | −8.9828E−02 | −7.3639E−02 |
| A6 = | 2.0066E+00 | 2.8670E−01 | −1.0101E+00 | −7.9202E−01 | −5.6615E−02 | 5.1721E−03 |
| A8 = | −2.0333E+00 | −6.1866E−01 | 6.4829E−01 | 4.8756E−01 | 5.4938E−02 | 4.5152E−03 |
| A10 = | 1.4775E+00 | 2.3810E+00 | −2.5515E−01 | −1.8177E−01 | −1.7911E−02 | −1.8590E−03 |
| A12 = | −8.4040E−01 | −2.9830E+00 | 6.2735E−02 | 4.0851E−02 | 2.9654E−03 | 2.9627E−04 |
| A14 = | 2.9021E−01 | 1.5435E+00 | −9.8033E−03 | −5.0514E−03 | −2.5137E−04 | −2.0775E−05 |
| A16 = | −4.0538E−02 | −2.9189E−01 | 7.5608E−04 | 2.5955E−04 | 8.6487E−06 | 5.2400E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.64 | (R5 + R6)/(R5 − R6) | −1.38 |
| Fno | 2.25 | (R7 + R8)/(R7 − R8) | 2.06 |
| HFOV [deg.] | 47.5 | \|f4/f1\| + \|f4/f2\| | 0.64 |
| T12/CT2 | 0.49 | \|f1/f2\| | 0.81 |
| ΣAT/EPD | 0.43 | (\|Sag51\| + \|Sag52\|)/CT5 | 0.98 |
| TL/[f*tan(HFOV)] | 1.35 | SagV6R2/CT6 | 0.87 |
| (ImgH/R11) + (ImgH/R12) | 6.55 | The quantity of critical point on the object-side surface 851 | 2 |
| (R3 + R4)/(R3 − R4) | 0.73 | The quantity of critical point on the image-side surface 852 | 2 |

9th Embodiment

Figure 17:
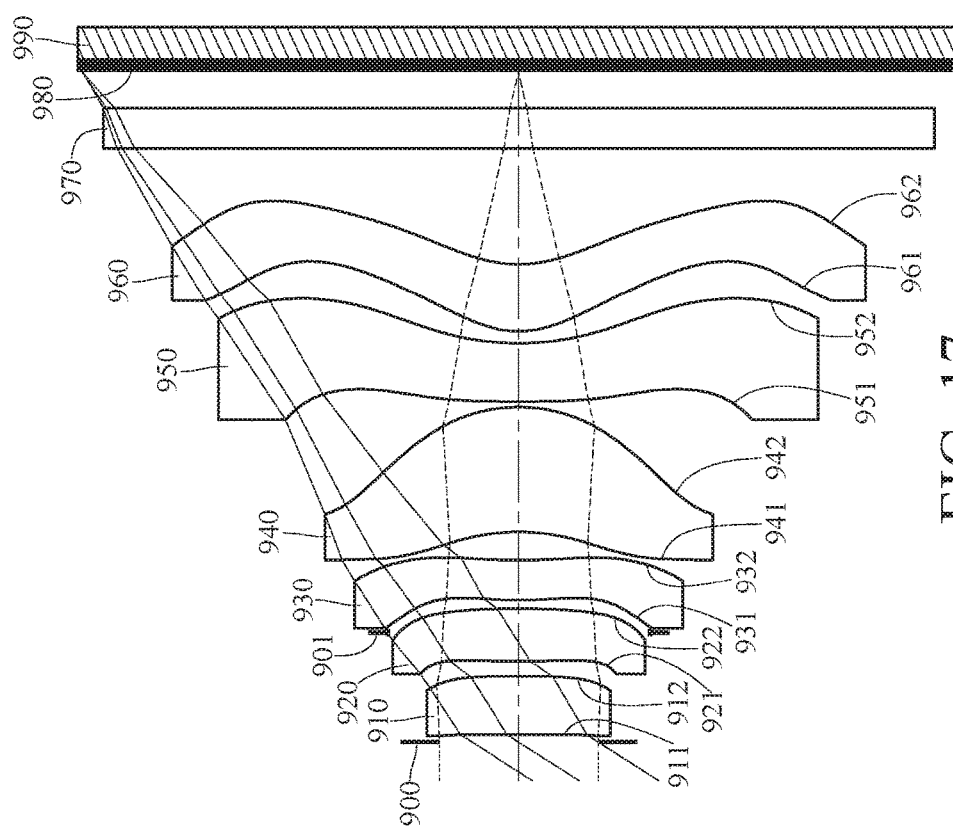
FIG. 17 is a schematic view of an image capturing unit according to the 9th embodiment of the present disclosure.
Figure 18:
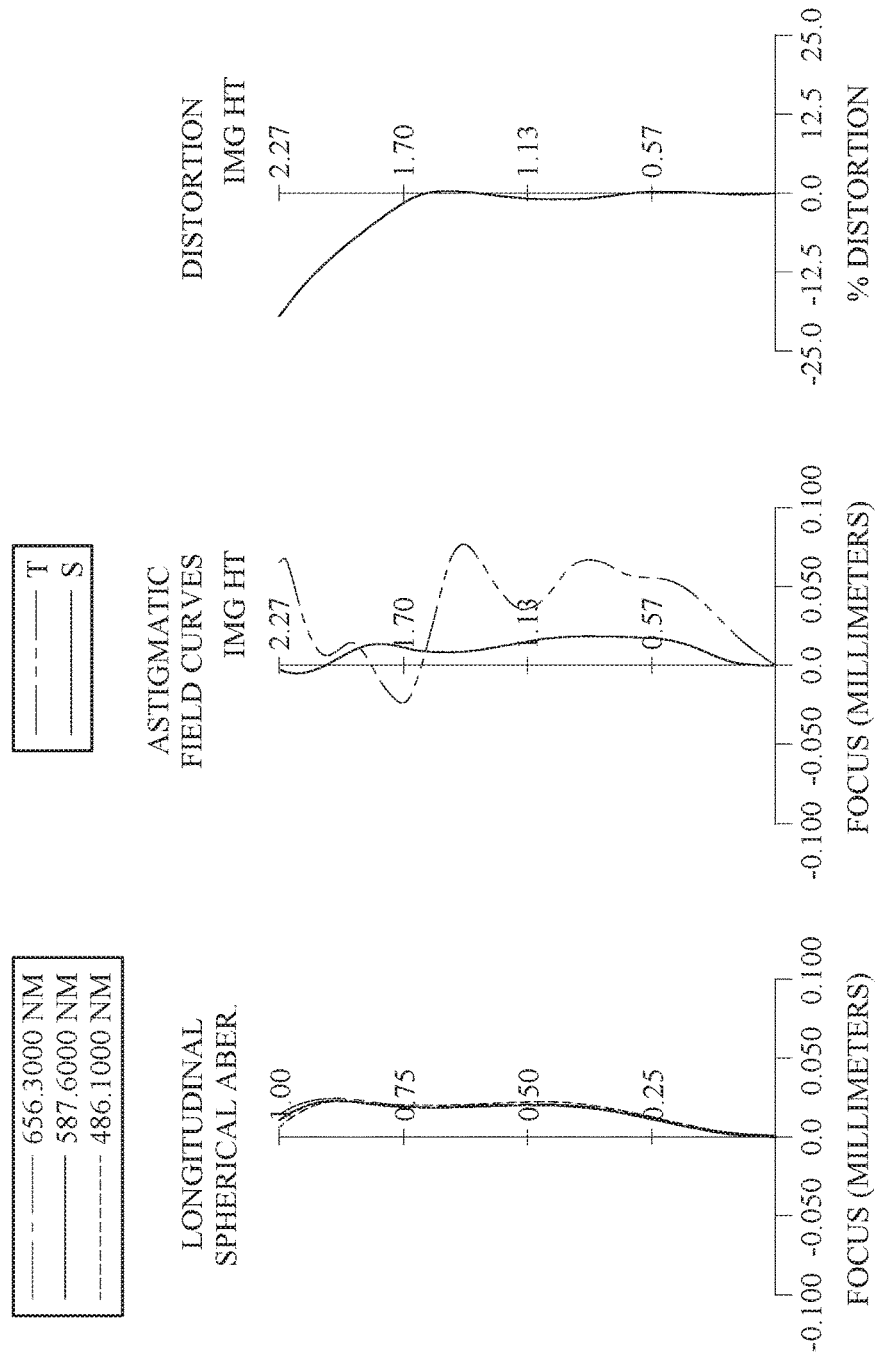
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 990. The imaging lens assembly includes, in order from an object side to an image side, an aperture stop 900, a first lens element 910, a second lens element 920, a stop 901, a third lens element 930, a fourth lens element 940, a fifth lens element 950, a sixth lens element 960, an IR-cut filter 970 and an image surface 980, wherein the imaging lens assembly has a total of six single and non-cemented lens elements (910-960).

The first lens element 910 with positive refractive power has an object-side surface 911 being convex in a paraxial region thereof and an image-side surface 912 being convex in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric. There is a tangent line to the object-side surface 921 at a maximum effective radius position of the object-side surface 921, and an intersection of the tangent line and an optical axis is closer to the image side of the imaging lens assembly than an axial vertex of the object-side surface 921.

The third lens element 930 with positive refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of plastic material and has the object-side surface 951 and the image-side surface 952 being both aspheric.

The sixth lens element 960 with positive refractive power has an object-side surface 961 being convex in a paraxial region thereof and an image-side surface 962 being concave in a paraxial region thereof. The sixth lens element 960 is made of plastic material and has the object-side surface 961 and the image-side surface 962 being both aspheric. The image-side surface 962 of the sixth lens element 960 has at least one convex shape in an off-axial region thereof.

The IR-cut filter 970 is made of glass material and located between the sixth lens element 960 and the image surface 980, and will not affect the focal length of the imaging lens assembly. The image sensor 990 is disposed on or near the image surface 980 of the imaging lens assembly.

The detailed optical data of the 9th embodiment are shown in Table 17 and the aspheric surface data are shown in Table 18 below.

TABLE 17

9th Embodiment
f = 1.80 mm, Fno = 2.18, HFOV = 57.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.038 | | | | |
| 2 | Lens 1 | 13.538 (ASP) | 0.303 | Plastic | 1.570 | 58.0 | 11.40 |
| 3 | | −12.401 (ASP) | 0.078 | | | | |
| 4 | Lens 2 | 6.427 (ASP) | 0.271 | Plastic | 1.570 | 58.0 | 6.53 |
| 5 | | −8.719 (ASP) | −0.123 | | | | |
| 6 | Stop | Plano | 0.168 | | | | |
| 7 | Lens 3 | 1.967 (ASP) | 0.210 | Plastic | 1.614 | 25.9 | 8.06 |
| 8 | | 3.131 (ASP) | 0.146 | | | | |
| 9 | Lens 4 | −1.127 (ASP) | 0.646 | Plastic | 1.570 | 58.0 | 3.50 |
| 10 | | −0.870 (ASP) | 0.030 | | | | |
| 11 | Lens 5 | 84.612 (ASP) | 0.300 | Plastic | 1.680 | 18.0 | −2.04 |
| 12 | | 1.362 (ASP) | 0.062 | | | | |
| 13 | Lens 6 | 0.481 (ASP) | 0.350 | Plastic | 1.570 | 58.0 | 1.86 |
| 14 | | 0.648 (ASP) | 0.600 | | | | |
| 15 | IR-cut filter | Plano | 0.210 | Glass | 1.517 | 64.2 | — |
| 16 | | Plano | 0.195 | | | | |
| 17 | Image | Plano | — | | | | |

Note:
Reference wavelength is 587.6 nm (d-line).
An effective radius of the stop 901 (Surface 6) is 0.680 mm.

TABLE 18

Aspheric Coefficients

| Surface # | 2 | 3 | 4 | 5 | 7 | 8 |
|---|---|---|---|---|---|---|
| k = | −4.8657E+01 | −8.9337E+01 | −3.3459E+01 | −3.4590E+01 | −4.5202E+01 | −2.5537E+01 |
| A4 = | −3.0387E−01 | −7.6290E−01 | −3.9579E−01 | −1.0077E+00 | −9.0826E−01 | −1.8697E−01 |
| A6 = | −6.0480E−01 | −1.5796E+00 | 2.5539E+00 | 5.2564E+00 | −4.3957E−01 | −1.9650E+00 |
| A8 = | 1.6863E+00 | −4.9293E+00 | −4.1593E+01 | −1.7171E+01 | −7.0946E+00 | 5.4713E+00 |
| A10 = | −1.8037E+01 | 7.3418E+00 | 1.3839E+02 | 1.6996E+01 | 3.1252E+01 | −6.2326E+00 |
| A12 = | — | — | −2.5752E+02 | −5.6090E+00 | −3.7246E+01 | 3.0537E+00 |
| A14 = | — | — | — | — | 1.3382E+01 | −5.3372E−01 |

| Surface # | 9 | 10 | 11 | 12 | 13 | 14 |
|---|---|---|---|---|---|---|
| k = | −2.1365E+01 | −1.3405E+00 | −1.0000E+00 | −1.9952E+01 | −2.3033E+00 | −1.5282E+00 |
| A4 = | −1.9222E+00 | −7.9082E−01 | 7.2107E−01 | 6.7915E−01 | −5.5741E−01 | −8.1078E−01 |
| A6 = | 9.3428E+00 | 2.3539E+00 | −1.6303E+00 | −1.4400E+00 | 7.3272E−01 | 8.1080E−01 |
| A8 = | −1.9922E+01 | −5.5098E+00 | 1.6298E+00 | 1.3308E+00 | −6.1364E−01 | −4.2254E−01 |
| A10 = | 2.3709E+01 | 8.3780E+00 | −9.3901E−01 | −6.8066E−01 | 2.7391E−01 | 1.0998E−01 |
| A12 = | −1.6000E+01 | −6.5968E+00 | 3.0026E−01 | 1.9596E−01 | −6.4231E−02 | −1.2515E−02 |
| A14 = | 5.5630E+00 | 2.4950E+00 | −5.2094E−02 | −2.9542E−02 | 7.4921E−03 | 2.0402E−04 |
| A16 = | −7.5969E−01 | −3.6176E−01 | 4.0869E−03 | 1.8000E−03 | −3.4263E−04 | 4.1241E−05 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 1.80 | (R5 + R6)/(R5 − R6) | −4.38 |
| Fno | 2.18 | (R7 + R8)/(R7 − R8) | 7.77 |
| HFOV [deg.] | 57.4 | \|f4/f1\| + \|f4/f2\| | 0.84 |
| T12/CT2 | 0.29 | \|f1/f2\| | 1.75 |
| ΣAT/EPD | 0.44 | (\|Sag51\| + \|Sag52\|)/CT5 | 0.75 |
| TL/[f*tan(HFOV)] | 1.22 | SagV6R2/CT6 | 0.94 |
| (ImgH/R11) + | 8.22 | The quantity of critical point on the | 1 |

-continued

| 9th Embodiment | | |
|---|---|---|
| (ImgH/R12) | | object-side surface 951 |
| (R3 + R4)/ | −0.15 | The quantity of critical point on the | 1 |
| (R3 − R4) | | image-side surface 952 |

The foregoing description, for the purpose of explanation, has been described with reference to specific embodiments. It is to be noted that TABLES 1-18 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
    a first lens element having positive refractive power;
    a second lens element with positive refractive power having an image-side surface being convex in a paraxial region thereof;
    a third lens element;
    a fourth lens element having positive refractive power;
    a fifth lens element having an object-side surface and an image-side surface being both aspheric; and
    a sixth lens element having an image-side surface being concave in a paraxial region thereof, wherein the image-side surface of the sixth lens element has at least one convex shape in an off-axial region thereof, and an object-side surface and the image-side surface of the sixth lens element are both aspheric;
    wherein the imaging lens assembly has a total of six lens elements, and each of the lens elements of the imaging lens assembly is a single and non-cemented lens element; a focal length of the first lens element is f1, a focal length of the second lens element is f2, a focal length of the fourth lens element is f4, a curvature radius of an object-side surface of the third lens element is R5, a curvature radius of an image-side surface of the third lens element is R6, and the following conditions are satisfied:

$|f4/f1|+|f4/f2|<0.92$;

$-8.0<(R5+R6)/(R5-R6)<0.50$; and $|f1/f2|<2.0$.

2. The imaging lens assembly of claim 1, wherein a sum of axial distances between each adjacent lens element of the imaging lens assembly is ΣAT, an entrance pupil diameter of the imaging lens assembly is EPD, and the following condition is satisfied:

$0<\Sigma AT/EPD<0.75$.

3. The imaging lens assembly of claim 1, wherein an axial distance between the first lens element and the second lens element is T12, a central thickness of the second lens element is CT2, and the following condition is satisfied:

$0<T12/CT2<0.80$.

4. The imaging lens assembly of claim 1, wherein at least one of the object-side surface and the image-side surface of the fifth lens element has at least two critical points from a paraxial region thereof to an off-axial region thereof.

5. The imaging lens assembly of claim 1, wherein a displacement in parallel with an optical axis from an axial vertex of the object-side surface of the fifth lens element to a maximum effective radius position of the object-side surface thereof is Sag51, a displacement in parallel with the optical axis from an axial vertex of the image-side surface of the fifth lens element to a maximum effective radius position of the image-side surface thereof is Sag52, a central thickness of the fifth lens element is CT5, and the following condition is satisfied:

$0<(|Sag51|+|Sag52|)/CT5<1.25$.

6. The imaging lens assembly of claim 1, wherein a maximum image height of the imaging lens assembly is ImgH, a curvature radius of the object-side surface of the sixth lens element is R11, a curvature radius of the image-side surface of the sixth lens element is R12, and the following condition is satisfied:

$5.5<(ImgH/R11)+(ImgH/R12)<10.0$.

7. The imaging lens assembly of claim 1, wherein the focal length of the first lens element is f1, the focal length of the second lens element is f2, a focal length of the third lens element is f3, the focal length of the fourth lens element is f4, a focal length of the fifth lens element is f5, a focal length of the sixth lens element is f6, a focal length of the x-th lens element is fx, and the following condition is satisfied:

$|f4|<|fx|$, wherein $x=1,2,3,5,6$.

8. The imaging lens assembly of claim 1, wherein a displacement in parallel with an optical axis from an axial vertex of the image-side surface of the sixth lens element to a critical point on the image-side surface thereof is SagV6R2, a central thickness of the sixth lens element is CT6, and the following condition is satisfied:

$0.75<SagV6R2/CT6<2.5$.

9. The imaging lens assembly of claim 1, wherein the fourth lens element has an object-side surface being concave in a paraxial region thereof and an image-side surface being convex in a paraxial region thereof; a curvature radius of the object-side surface of the fourth lens element is R7, a curvature radius of the image-side surface of the fourth lens element is R8, and the following condition is satisfied:

$1.5<(R7+R8)/(R7-R8)<10$.

10. The imaging lens assembly of claim 1, wherein a focal length of the imaging lens assembly is f, an axial distance between an object-side surface of the first lens element and an image surface is TL, half of a maximal field of view of the imaging lens assembly is HFOV, and the following condition is satisfied:

$TL/[(f*\tan(HFOV)]<1.50$.

11. The imaging lens assembly of claim 1, wherein the focal length of the first lens element is f1, the focal length of the second lens element is f2, a focal length of the third lens element is f3, a focal length of the fifth lens element is f5, a focal length of the sixth lens element is f6, a focal length of the y-th lens element is fy, and the following condition is satisfied:

$|f6|<|fy|$, wherein $y=1,2,3,5$.

12. The imaging lens assembly of claim 1, wherein a curvature radius of an object-side surface of the second lens element is R3, a curvature radius of the image-side surface of the second lens element is R4, and the following condition is satisfied:

$-0.25<(R3+R4)/(R3-R4)<2.0$.

13. The imaging lens assembly of claim 1, wherein there is a tangent line to an object-side surface of the second lens element at a maximum effective radius position of the object-side surface thereof, and an intersection of the tangent line and an optical axis is closer to the image side of the imaging lens assembly than an axial vertex of the object-side surface of the second lens element is to the image side of the imaging lens assembly.

14. The imaging lens assembly of claim 1, wherein the curvature radius of the object-side surface of the third lens element is R5, the curvature radius of the image-side surface of the third lens element is R6, and the following condition is satisfied:

$-3.0<(R5+R6)/(R5-R6)<0.25.$

15. The imaging lens assembly of claim 1, wherein the image-side surface of the fifth lens element is convex in a paraxial region thereof.

16. An image capturing unit, comprising:
   the imaging lens assembly of claim 1; and
   an image sensor, wherein the image sensor is disposed on an image surface of the imaging lens assembly.

17. An electronic device, comprising:
   the image capturing unit of claim 16.

18. An imaging lens assembly comprising, in order from an object side to an image side:
   a first lens element having positive refractive power;
   a second lens element with positive refractive power having an image-side surface being convex in a paraxial region thereof;
   a third lens element;
   a fourth lens element having positive refractive power;
   a fifth lens element having an image-side surface being convex in a paraxial region thereof, wherein an object-side surface and the image-side surface of the fifth lens element are both aspheric; and
   a sixth lens element having an image-side surface being concave in a paraxial region thereof, wherein the image-side surface of the sixth lens element has at least one convex shape in an off-axial region thereof, and an object-side surface and the image-side surface of the sixth lens element are both aspheric;
   wherein the imaging lens assembly has a total of six lens elements, and each of the lens elements of the imaging lens assembly is a single and non-cemented lens element; a focal length of the first lens element is f1, a focal length of the second lens element is f2, a focal length of the fourth lens element is f4, a curvature radius of an object-side surface of the second lens element is R3, a curvature radius of the image-side surface of the second lens element is R4, a curvature radius of an object-side surface of the third lens element is R5, a curvature radius of an image-side surface of the third lens element is R6, and the following conditions are satisfied:

$|f4/f1|+|f4/f2|<1.0;$ $-8.0<(R5+R6)/(R5-R6)<0.50;$ and $-0.50<(R3+R4)/(R3-R4)<8.0.$ 19. The imaging lens assembly of claim 18, wherein an axial distance between the first lens element and the second lens element is T12, a central thickness of the second lens element is CT2, and the following condition is satisfied:

$0<T12/CT2<0.80.$

20. The imaging lens assembly of claim 18, wherein the curvature radius of the object-side surface of the third lens element is R5, the curvature radius of the image-side surface of the third lens element is R6, and the following condition is satisfied:

$-3.0<(R5+R6)/(R5-R6)<0.25.$

21. The imaging lens assembly of claim 18, wherein the curvature radius of the object-side surface of the second lens element is R3, the curvature radius of the image-side surface of the second lens element is R4, and the following condition is satisfied:

$-0.25<(R3+R4)/(R3-R4)<2.0.$

22. The imaging lens assembly of claim 18, wherein a focal length of the imaging lens assembly is f, an axial distance between an object-side surface of the first lens element and an image surface is TL, half of a maximal field of view of the imaging lens assembly is HFOV, and the following condition is satisfied:

$TL/[f*\tan(HFOV)]<1.50.$

23. The imaging lens assembly of claim 18, wherein the focal length of the first lens element is f1, the focal length of the second lens element is f2, a focal length of the third lens element is f3, the focal length of the fourth lens element is f4, a focal length of the fifth lens element is f5, a focal length of the sixth lens element is f6, a focal length of the x-th lens element is fx, and the following condition is satisfied:

$|f4|<|fx|,$ wherein $x=1,2,3,5,6.$

24. The imaging lens assembly of claim 18, wherein a sum of axial distances between each adjacent lens element of the imaging lens assembly is ΣAT, an entrance pupil diameter of the imaging lens assembly is EPD, and the following condition is satisfied:

$0<\Sigma AT/EPD<0.75.$

25. The imaging lens assembly of claim 18, wherein a displacement in parallel with an optical axis from an axial vertex of the image-side surface of the sixth lens element to a critical point on the image-side surface thereof is SagV6R2, a central thickness of the sixth lens element is CT6, and the following condition is satisfied:

$0.75<SagV6R2/CT6<2.5.$

26. The imaging lens assembly of claim 18, wherein a displacement in parallel with an optical axis from an axial vertex of the object-side surface of the fifth lens element to a maximum effective radius position of the object-side surface thereof is Sag51, a displacement in parallel with the optical axis from an axial vertex of the image-side surface of the fifth lens element to a maximum effective radius position of the image-side surface thereof is Sag52, a central thickness of the fifth lens element is CT5, and the following condition is satisfied:

$0<(|Sag51|+|Sag52|)/CT5<1.25.$

* * * * *